United States Patent
Fevola et al.

(10) Patent No.: US 12,514,793 B2
(45) Date of Patent: Jan. 6, 2026

(54) METHOD OF USING IN SITU COMPLEXATION OF SURFACTANTS FOR FOAM CONTROL AND CONDITIONING

(71) Applicant: Kenvue Brands LLC, Summit, NJ (US)

(72) Inventors: Michael J. Fevola, Belle Mead, NJ (US); Tobias Johannes Futterer, Princeton, NJ (US); Barry Setiawan, East Amherst, NY (US)

(73) Assignee: Kenvue Brands LLC, Summit, NJ (US)

( * ) Notice: Subject to any disclaimer, the term of this patent is extended or adjusted under 35 U.S.C. 154(b) by 0 days.

(21) Appl. No.: 17/227,190

(22) Filed: Apr. 9, 2021

(65) Prior Publication Data

US 2021/0338541 A1 Nov. 4, 2021

Related U.S. Application Data

(60) Provisional application No. 63/013,693, filed on Apr. 22, 2020.

(51) Int. Cl.
| | | |
|---|---|---|
| *A61Q 19/00* | (2006.01) | |
| *A61K 8/04* | (2006.01) | |
| *A61K 8/44* | (2006.01) | |
| *A61K 8/46* | (2006.01) | |
| *A61K 8/60* | (2006.01) | |

(52) U.S. Cl.
CPC ............ *A61K 8/046* (2013.01); *A61K 8/442* (2013.01); *A61K 8/466* (2013.01); *A61K 8/60* (2013.01); *A61K 2800/596* (2013.01); *A61K 2800/87* (2013.01); *A61K 2800/882* (2013.01)

(58) Field of Classification Search
None
See application file for complete search history.

(56) References Cited

U.S. PATENT DOCUMENTS

| | | | |
|---|---|---|---|
| 6,161,729 A | 12/2000 | Gentile et al. | |
| 6,500,413 B1 * | 12/2002 | Kapsner | A61K 8/60 |
| | | | 424/70.6 |
| 7,307,051 B2 | 12/2007 | Rich | |
| 2005/0184090 A1 | 8/2005 | DeJonge | |
| 2012/0093753 A1 * | 4/2012 | Fevola | C07C 217/38 |
| | | | 514/452 |
| 2013/0171088 A1 | 7/2013 | Frantz | |
| 2016/0309871 A1 * | 10/2016 | Torres Rivera | A61Q 5/02 |

FOREIGN PATENT DOCUMENTS

| | | |
|---|---|---|
| CA | 2239723 | 6/1998 |
| CN | 1564861 A | 1/2005 |
| CN | 103140210 A | 6/2013 |
| ES | 2140550 T3 | 3/2000 |
| GB | 2540574 | 1/2017 |
| MX | 199804602 A | 7/1999 |
| MX | 206737 B | 2/2002 |
| WO | WO1998033477 A1 | 8/1998 |

OTHER PUBLICATIONS

European Search Report for corresponding EPA No. 21169993.9 dated Oct. 8, 2021, pp. 1-7.

* cited by examiner

*Primary Examiner* — Brian Gulledge
(74) *Attorney, Agent, or Firm* — Rachel Chaves

(57) ABSTRACT

A cleansing composition and method of using the cleansing composition, including a first composition including an anionic surfactant and a second composition including a cationic surfactant, where the first composition and second composition are maintained in separate containers and are dispensed and combined to form a combined foam, the combined foam having a reduced volume within a desired time after combination.

13 Claims, 8 Drawing Sheets

METHOD OF USING IN SITU COMPLEXATION OF SURFACTANTS FOR FOAM CONTROL AND CONDITIONING

CROSS-REFERENCE TO RELATED APPLICATIONS

The present claims priority to U.S. Patent Application No. 63/013,693, which was filed on Apr. 22, 2020, the entire contents of which are incorporated herein by reference.

FIELD OF THE INVENTION

The present invention includes compositions and methods for forming in situ complexation of surfactants, giving controlled foaming and improved rinsibility of surfactants from skin or hair of the user.

BACKGROUND OF THE INVENTION

It is often desired that a cleansing composition provides quick and sufficient foaming, particularly when used by a user. Foaming is a good indicator to the user that the product is working to cleanse the body, however, foaming products often need significant amount of water and time to rinse the foam off of the body, further, even though foam is a visual indicator for good cleansing efficacy, it may sometimes be perceived by users as being less mild to the skin. Typically, foaming cleansers can cleanse effectively but may not leave the skin feeling moisturized. Examples include soap-based cleansers and sodium laureth sulfate-based cleansers. Some attempts to provide a foaming cleanser with some moisturized skin feel and touch include structured surfactant systems and emulsions in micellar formulations containing emollients and conditioning components, among others. Other attempts to provide cleansers with significant moist skin feel and touch include oil-based cleansing systems, also referred to as in shower lotions. While these systems provide good skin conditioning and the desired caring skin feel and touch, these cleansers do not foam.

The aforementioned current state-of-the-art cleansers can either foam well, but require a long rinsing time with no to only moderate skin conditioning effect, or provide a desired caring skin feel but do not foam. Therefore, there is still a desire for a product that has good initial foaming, yet having the foam break down quickly to cue the user mildness, and to allow for simpler, faster rinse-off. Further, it is desirable to deliver skin conditioning, thereby providing a soft and gliding sensorial experience on skin, which indicates benefits such as moisturization to a user. To achieve significant conditioning, it is typical that cleansing compositions contain large amounts of oils and high molecular weight polymers, which have an impact on the product's clarity.

The present invention relates to a cleansing system, which provides an initial foamed composition to be applied to the skin, where the foam breaks down within a desired time period. The breakdown of foam allows for easier, faster rinse off and cues mildness to the user. Further, the cleansing system transforms into a moisturized conditioning system in the process of the foam breakage. The cleansing system exhibits initial high foam volume, rich and creamy foaming effect, followed by quick foam breakage and ease of rinsing, while simultaneously providing moist conditioning with mild, sensorial touch and feel benefit to the skin. The cleansing system may optionally further include moisturizing or conditioning agents to provide enhanced moisturizing effect.

BRIEF DESCRIPTION OF THE FIGURES

FIG. 2(a) shows the initial foam upon dispensing and FIG. 2(b) show the in-use foam result.

FIG. 3(a) shows the initial foam upon dispensing and FIG. 3(b) shows the in-use foam result.

FIG. 4(a) shows the initial foam upon dispensing and FIG. 4(b) shows the in-use foam result.

FIG. 5(a) shows the initial foam upon dispensing and FIG. 5(b) shows the in-use foam result.

SUMMARY OF THE INVENTION

Figure 1A:
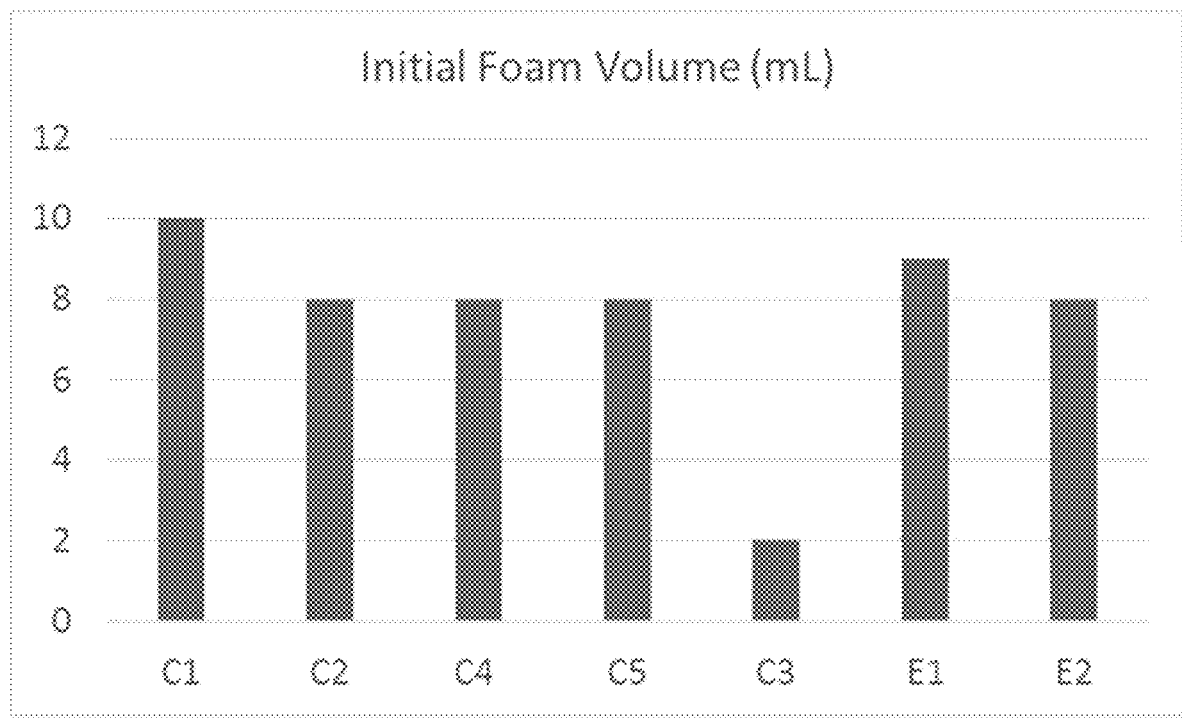
FIG. 1a depicts the initial foam volume of Comparative Examples C1-C5 and Inventive Examples E1-E2.

The invention relates to a cleansing composition and methods of making and using a cleansing composition. A cleansing composition may include a combination of: a first composition including an anionic surfactant; and a second composition including a cationic surfactant, where the cationic surfactant is a cationic compound; where the first composition and second composition are maintained in separate containers and are each individually dispensed in the form of a foam, and where the first and second compositions are combined together to form the cleansing composition. The cleansing composition may exhibit one or more parameters, including initial foam volume, charge mol ratio of surfactants, surfactant weight percent, reduced foam value, foam retention period, and rinsing time.

There is also a method of cleansing a target area of skin, which includes one or more steps of having a first composition in a first container, the first composition including an anionic surfactant; having a second composition in a second container, the first composition including a cationic surfactant; dispensing the first composition and second composition concurrently such that they contact each other upon dispensing as foams to form a combined composition, the combined composition having an initial foam volume; applying the combined composition to the target area of skin, where the combined composition results in a reduced foam composition within about 30 seconds of application to the target area of skin, the reduced foam composition having a reduced foam volume of less than 70% of the initial foam volume; and rinsing the reduced foam composition from the target area of skin.

DETAILED DESCRIPTION OF THE INVENTION

The present invention relates to a cleansing system, method of using the cleansing system, kits and apparatuses for dispensing the cleansing system, and combinations thereof. As used herein, the term "cleansing system" relates to a composition or blend of compositions that are applied by a user to the skin, hair, or other body surface to cleanse the desired body surface. Cleansing systems may be in any form, but are desirably maintained in liquid form. It may be desired that the cleansing system be dispensed as a foamed liquid, or as a plurality of foamed liquids that are or can be mixed together by the user. Cleansing systems often include at least one carrier, such as water, which is safe to use on the body surface of the user.

As used throughout the application, the term "foam" refers to a mixture of gas (typically air) and aqueous liquid containing surface active agents (such as surfactants). The gas is present in form of air bubbles with radius of typically from 0.1 millimeter to 10 millimeters. The liquid phase is surrounding the air bubbles, separating them from each other with membranes of liquid phase with the surface active agent at the gas-liquid interface. The volume ratio of liquid-to-gas phase is from 0.1 to 0.3 for "wet foam" (spherical bubbles) and less than 0.1 for "dense foam" (polyhedral bubbles), respectively. A "foaming composition" generates such foam for example through a typical personal care foam pump. Once generated, the foam has to show a measure of foam stability with at least 70% of the initial foam volume remaining 1 minute after its generation, in the absence of agitation, disturbance of the foam. As further used herein, the term "foamed composition" is foam generated from a "foaming composition". A "foaming composition" includes an aqueous solution of surfactants in water. Additional components may include solvents, salts, emollients, polymers, preservatives and the like. The foaming composition may result in a foamed composition through the use of one or more devices to expel the composition in the form of a foam, as described below.

In use, the user applies a cleansing system to the body, which includes two Foamed Compositions, described below. The user applies the two or more Foamed Compositions on the desired area or regions of the surface to be treated, such as a body, including, for example, areas of the skin or hair, as desired. After a desired length of time of foam application, referred to as the Foam Retention Period, the now Foamed Combined Composition begins to break down and results in a reduced foam composition. Within the Foam Retention Period, there is a perceivable breakage of foam, resulting in this reduced foam composition. The remaining foam volume of the reduced foam composition may be measured in any desired way, and in one aspect may be measured by a High Shear Foam Mixing Test (described below). The remaining foam volume, as measured by the High Shear Foam Mixing Test, is no greater than about 70% of the initial foam volume, or no greater than about 50% of the initial foam volume, or no greater than about 30% of the initial foam volume, and may be less than about 20% of the initial foam volume. The absence of significant amount of foam cues the user that application is complete, the cleansing system is mild, and the user may cease applying the system to his or her body and rinse it off. Alternatively, the user may continue to apply the system even after the Foam Retention Period is completed. The user then rinses the cleansing system from the surface or body region(s) to which it is applied, such as through application of water, which requires less time and water than rinsing typical cleansers, since through the use of the current innovation, no or only little foam is to be rinsed after the foam has broken down. Cleansing systems such as those described herein cleanse the body surface of dirt and oil, as well as other components that are desired to be removed from the body, such as makeup or other substances.

In addition, the inventive cleansing system not only cleanses the body surface to which it is applied, but also may provide the body surface with significant conditioning during and after the cleansing process, thereby providing desired sensorial experience on skin, e.g. a soft and gliding sensation which indicates benefits such as care and moisturization to a user. Cleansing systems of the present invention may optionally include moisturization. If included, moisturization is achieved and/or enhanced through the inclusion of one or more moisturizing elements into the cleansing system, described below.

The present invention solves many of the issues with currently available cleansing systems. For example, structured surfactant systems stabilize dispersed oil droplets through close packing (volume fraction greater than 65%), which allows good cleansing and foaming as well as some conditioning, but these systems usually require high levels of surfactant and have possibility of skin irritation and limitation on types of surfactants, and they often require long rinsing times. Micellar cleansing formulations can foam well but typically require long rinsing times. When cleansers are formulated with oils for conditioning, they typically exhibit less desirable foaming profiles due to the requirement for stabilization of oil droplets by the surfactants. The high foaming as well as the inability to condition effectively is intrinsic to those systems as the surfactants maintain their ability to foam and to emulsify dirt and oil (including the emollient/conditioning oils/components) throughout the application followed by the rinsing process. An alternative approach is to apply oil cleansers (often referred to as in shower lotions) to improve the skin care and touch aspect of cleansing formulation. The oil cleansing formulations often contain high amounts of oil, which do not provide sufficient foaming and cleansing efficacy due to absence of effective surfactants and presence of the high oil levels, at such, they are perceived by consumers more as a lotion, rather than a cleanser. Finally, soap-based cleansing formulations do provide good foaming, but do not provide suitable skin conditioning to the user and they have a high pH (>8) which causes and amplifies skin irritation not desired by the user.

The present invention may be better understood through the following description. As used herein, the following terms are defined. A "First Composition" is a composition including at least one cationic surfactant containing product (described in more detail below) and is substantially free or free of any anionic surfactants. A "Second Composition" is a composition including at least one anionic surfactant, where the Second Composition is substantially free or free of any cationic surfactants. The First Foamed Composition is a foam made from the First Composition, e.g. by dispensing from a dispensing apparatus in the form of a foamed product.

The Second Foamed Composition is a foam made from the Second Composition, e.g. by dispensing from a dispensing apparatus in the form of a foamed product. The Foamed Combined Composition is the blend of the First Foamed Composition and the Second Foamed Composition. The Foamed Combined Composition is generated during use, or may be generated immediately upon dispensing the First and Second Foamed Compositions in such a fashion that the two contact each other during dispensing.

The "Foam Retention Period" is the length of time that begins (1) when the First Foamed Composition and the Second Foamed Composition are combined to form the Foamed Combined Composition (which may be, for example, when the two Foamed Compositions are applied to the skin surface or may be at the onset of their mixing to form the Foamed Combined Composition), and ends (2) when there is a perceivable breakage of foam with no further foam reduction upon mixing or agitation. The remaining foam volume, which may be measured by the High Shear Foam Mixing Test (described below) is the same as that described above, e.g., it may be no greater than about 70% of the initial foam volume, or no greater than about 50% of the initial foam volume, or no greater than about 30% of the initial foam volume, and even more preferably may be less than about 20% of the initial foam volume. The resulting composition is referred to as a "Reduced Foam Composition". It is understood that the term "reduced foam" as used herein does not mean the absence of any bubbles, rather it is a relative term that refers to a perceivable reduction of foam volume in the composition. In use, the Reduced Foam Composition may be achieved after the user applies the Foamed Combined Composition to the target area of skin desired. The High Shear Foam Mixing Test may be used to evaluate compositions.

The present invention provides a cleansing system, a method of using a cleansing system, a method of packaging and/or dispensing a cleansing system, and a kit including a cleansing system, where the cleansing system includes a First Composition and a Second Composition. The First Composition is a composition including a cationic surfactant (including those cationic surfactants described below), and the Second Composition is a composition including an anionic surfactant. As explained above, the First Composition is free of an anionic surfactant, and the Second Composition is free of a cationic surfactant (including those cationic surfactants described below).

The First Composition and the Second Composition are separately stored from each other. It is preferred that the first and second compositions be separately maintained, such as in separate chambers either within the same device or separate devices. Devices useful include foam generating devices or dispensing devices that can dispense foam. The foam generator/dispensing device (or separate devices, if used) can be pressurized or non-pressurized, with or without propellant, may be a handheld device, or may be a tabletop device. Examples of dual chamber dispensers include U.S. Pat. Nos. 7,307,051, 6,161,729, U.S. Patent Publication Number 2005/0184090, as well as patent publication numbers: ES2140550T3, MX199804602A, ZA199404678A, MX206737B, and GB2540574, the entire contents of each of which are incorporated by reference herein.

In use, the First Composition and the Second Composition are dispensed separately, such that they each individually provide the First Foamed Composition and the Second Foamed Composition. The First Foamed Composition and the Second Foamed Composition are brought into contact with each other after dispensing from their individual chambers, resulting in the Foamed Combined Composition. It may be desired that the First Composition and Second Composition are dispensed in a side-by-side manner such that they each come into contact with each other immediately upon dispensing to form the Foamed Combined Composition. Alternatively, it may be desired that the First Composition and Second Composition are dispensed and brought into contact with each other by the user, to form the Foamed Combined Composition. The First Foamed Composition may have an initial foam volume of at least 1.5 mL, or at least 3 mL, or at least 4 mL when dispensed, and the Second Foamed Composition may have an initial foam volume of at least 1.5 mL, or at least 3 mL, or at least 4 mL when dispensed. The Foamed Combined Composition may have an initial foam volume of at least 3 mL, 6 mL, or 8 mL when the two Compositions are initially combined together. Initial foam volume may be measured according to the Initial Foam Volume Upon Dispensing from a Foam Pump method described below. As described above, after combining the foamed compositions together, the resulting Foamed Combined Composition begins to break down its foam content into a resulting composition with lower foam volume. The user may apply the First Foamed Composition and the Second Foamed Composition to the surface or surfaces of the body and/or hair as desired, where a) the First and Second Foamed Compositions cleanse the surfaces, and b) the Foamed Combined Composition is generated by the user upon mixing. The Foamed Combined Composition loses its foam volume rapidly, which ultimately results in a lower foam volume, as described above, and may be continued to be applied/distributed onto surfaces and be rinsed off. The Foamed Combined Composition may lose its foam through agitation or use by the user, or may lose its foam by the High Shear Foam Mixing Test described below.

The Foamed Combined Composition begins to reduce its foam volume, as described above, during the Foam Retention Period. Desirably, the Foam Retention Period is less than about 30 seconds, or is less than about 20 seconds, or is less than about 10 seconds, depending upon if and how the user applies and mixes or agitates the two or more Foamed Compositions during use. After the foam bubbles are broken down, the Reduced Foam Composition is formed. One benefit of the present invention is that the presence of the Reduced Foam Composition on the user's skin or hair provides a sensorial cue to the user that the product has been sufficiently applied. Further, the presence of the Reduced Foam Composition allows quick rinsing performance compared to foamed compositions, and (if a moisturizing agent is included) provides moisturization to the body surface. Further, the Reduced Foam Composition provides effective conditioning, skin feel, soft touch, and gliding due to complexation of anionic and cationic surfactants from the First and Second Foamed Compositions. The complexation transforms the anionic and cationic surfactants from foaming and emulsifying surface actives into non- or low-foaming components exhibiting emollient behavior. Such in situ transition allows to combine different desired properties/behaviors into a single cleansing system at different point of use.

It is important that the First Composition and the Second Composition be maintained separately from each other until dispensed, until they are combined (either immediately due to the side-by-side dispensing apparatus, or through use by the user). The benefits of using a Foamed Combined Composition that undergoes a physical change during the Foam Retention Period cannot be achieved by using the compositions separately, or by mixing the compositions together into one composition before use. Separate maintenance and dispensing until the desired use allows for the initial foaming profile of the Foamed Combined Composition to be met, but then broken down in a relatively quick time period to form the Reduced Foam Composition, providing the benefits of the present invention.

Cationic Surfactants:

Cationic surfactants are useful in the cleansing compositions, and may include any desired cationic surfactant. Classes of cationic surfactants that are suitable for use in this invention include alkyl quaternaries (mono, di, tri), benzyl quaternaries, ester quaternaries, ethoxylated quaternaries, amide quaternaries, alkylamine oxides, and respective alkyl amines, and mixtures thereof, wherein the alkyl group has from about 6 carbon atoms to about 30 carbon atoms, with about 8 to 22 carbon atoms being preferred and with about 8 to 16 carbon atoms even more preferred. Non-limiting examples of alkyl quaternaries include lauryl-trimethylammonium chloride, cocoyl-trimethylammonium bromide, myristyl-ethyl-dimethylammonium chloride. Non-limiting examples of benzyl quaternaries include lauryl-dimethylbenzylammonium chloride, cocoyl-dimethylbenzylammonium chloride, decyl-dimethylbenzylammonium chloride. Non-limiting examples of ester quaternaries include diethyl monolauric acid ester dimethylammonium chloride, ethyl cocoacid ester trimethylammonium methosulfate, triethanol-based ester quats. Non-limiting examples of ethoxylated quaternaries include the Berol series from Akzo Nobel (as described in U.S. Pat. No. 6,605,584 B2), lauryl-hydroxyethyldimethylammonium chloride, laureth-3-hydroxyethyl-dimethylammonium bromide, cocoyl-triethylene glycol dimethylammonium ethosulfate. Non-limiting examples of amide quaternaries include laurylamidopropyl-trimethylammonium chloride, cocoylamidopropyl-trimethylammonium bromide, laurylamidopropyl PG-dimonium chloride, cocamidopropyl PG-dimonium chloride, caprylamidopropyl PG-dimonium chloride, and capryloylamidopropyl PG-dimonium chloride. Non-limiting examples of alkylamine oxides include laurylamidopropyl-dimethylamine oxide, lauryl-dimethylamine oxide, cocoyl-dimethylamine oxide. Non-limiting examples of respective alkyl amines include lauryl-dimethylamine, lauramidopropyl-dimethylamine, cocoyl-dimethylamine, stearyl-dimethylamine, lauryl-di-(hydroxyethyl)-amine, cocoyl-di-(triethylene glycol)amine, ethyl cocoacid ester drimethylamine. Compositions containing alkyl amine should be at a pH of below 8, more preferred below 7 and even more preferred at below 6 to generate the cationic charge at the amine group. "Alkyl" in the description of suitable cationic surfactants includes linear and branched carbon chains, saturated and unsaturated chains, ethoxylated carbon chains, carbon chains with ether groups, amide groups, ester groups and the alike. Cationic polyglyceryl compounds are useful in the present composition.

The First Composition may include the cationic compound in any desired amount from about 1% to about 20% by weight of the First Composition. Preferably, the First Composition includes a cationic compound in an amount of about 5-16% by weight of the First Composition, or about 10-16% by weight of the First Composition. In one particular embodiment, the First Composition includes the cationic compound in an amount of about 16% by weight of the First Composition.

Cationic Polyglyceryl Compounds

As described above, the cleansing system described herein includes a First Composition, and may include a cationic polyglyceryl compound. Suitable cationic polyglyceryl compounds include surfactant compounds that are described in U.S. Pat. No. 10,285,923, the entire contents of which are incorporated by reference herein.

According to certain embodiments, the cationic polyglyceryl compounds may be further illustrated with reference to Formula I:

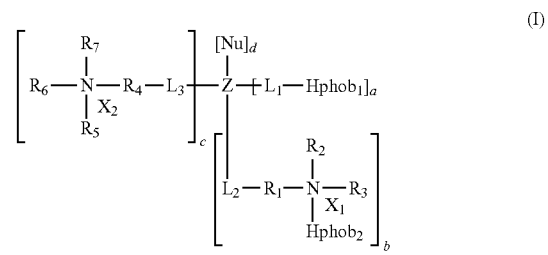

wherein, according to this embodiment:
Z is a polyglyceryl node structure that comprises at least 3 contiguous glyceryl remnant units;
Nu are independently selected nucleophilic groups which are directly linked to Z;
d is the number of nucleophilic groups bonded to Z, and is from 2 to 21;
$L_1$ is an independently selected linking group which links Z to $Hphob_1$;
$Hphob_1$ is an independently selected hydrophobic moiety comprising 6 to 30 carbons;
a is the number of $Hphob_1$ linked to the node structure Z, each via an $L_1$, and is from zero to 10;
$L_2$ is an independently selected linking group which links Z to a cationic group $—R_1—N—[(R_2)(R_3)(Hphob_2)]$;
$R_1$ is an independently selected linear or branched alkylene ($—CH—$ to $—C_6H_{12}—$) or monohydroxyalkylene ($—CH(OH)—$ to $—C_6H_{11}(OH)—$);
N is a nitrogen atom;
$R_2$ is an independently selected alkyl group containing 1 to 4 carbons ($CH_3$ to $C_4H_9$) or a hydrogen atom;
$R_3$ is an independently selected alkyl group containing 1 to 4 carbons ($CH_3$ to $C_4H_9$) or a hydrogen atom, or an independently selected hydrophobic moiety;
$Hphob_2$ is an independently selected hydrophobic moiety comprising 6 to 30 carbons;
$X_1$ is an anionic counterion or absent;
b is the number of $(R_1—N—[(R_2)(R_3)(Hphob_2)])$ linked to the node structure, Z, each via an $L_2$, and is from zero to 10;
$L_3$ is an independently selected linking group which links Z to cationic group $—R_4—N—[(R_5)(R_6)(R_7)]$;
$R_4$ is an independently selected linear or branched alkylene ($—CH—$ to $—C_6H_{12}—$) or monohydroxylalkylene ($—CH(OH)—$ to $—C_6(OH)H_{11}(OH)—$);
$R_5$, $R_6$, $R_7$ are each an independently selected alkyl or alkenyl group containing 1 to 4 carbons ($CH_3$ to $C_4H_9$);
$X_2$ is a anionic counterion or absent;
c is the number of $(R_4—N—[(R_5)(R_6)(R_7)])$ linked to the node structure, Z, each via an $L_3$, and is from zero to 10;
wherein the sum of a and b is from 1 to 10 inclusive;
the sum of b and c is from 1 to 10 inclusive; and
the sum of a, b, and c is from 1 to 10 inclusive.

The compositions of the present invention may include a polyglyceryl compound having a node structure comprising at least three contiguous glyceryl remnant units. By "glyceryl remnant unit," it is meant glycerol units excluding nucleophilic groups such as hydroxyl groups. Glyceryl remnant units generally may be represented as $C_3H_5O$ for linear and dendritic remnants. Suitable glyceryl remnant units are dehydrated forms (i.e. one mole of water removed) of the following glyceryl units: linear-1,4 ($L_{1,4}$) glyceryl units; linear-1,3 ($L_{1,3}$) glyceryl repeat units; dendritic (D) glyceryl units; terminal-1,2 ($T_{1,2}$) units; and terminal-1,3

($T_{1,3}$) units. Examples of such glyceryl remnant repeat and terminal units are shown below (to the right side of the arrows). The corresponding glyceryl unit (shown to the left side of arrows; includes hydroxyls) are shown as well: linear-1,4 ($L_{1,4}$) glyceryl repeat units

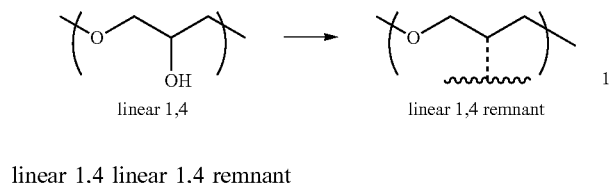

linear 1,4 linear 1,4 remnant

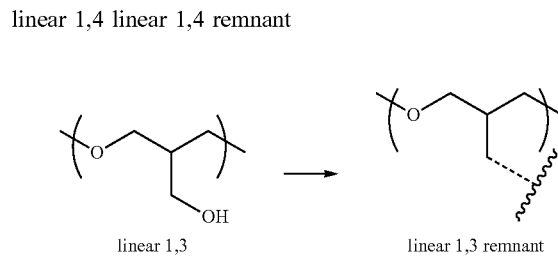

dendritic (D) glyceryl repeat units, which lead to branched or cyclic compounds

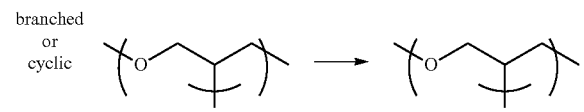

terminal-1,2 ($T_{1,2}$) units

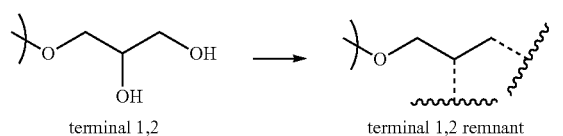

and terminal-1,3 ($T_{1,3}$) units

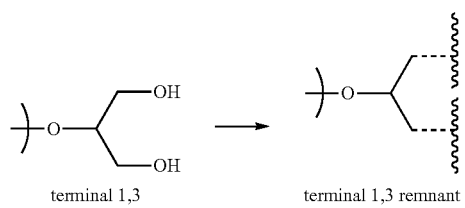

In certain embodiments, in addition to glyceryl remnant units, a node structure may comprise one or more additional oxyalkyl units. The oxyalkyl units may be generically described as —(O—R)— where R=$C_1$-$C_4$ linear or branched alkyl, such as —$CH_2CH_2$—, —$CH(CH_3)CH_2$—, and —$CH_2CH_2CH_2$—, that originate from reacting optional co-monomers such as 1,2-ethanediol, 1,2-propanediol, 1,3-propanediol, ethylene carbonate, 1,2 propylene carbonate, and 1,3 propylene carbonate. For example, a general formula of glyceryl remnant unit and adjacent oxyalkyl unit may be illustrated as:

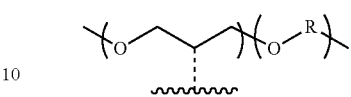

and, as further example, a polyglyceryl-co-1,3-propanediol and accordingly have the node structure:

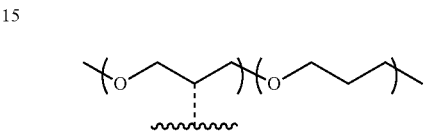

As will be recognized by those of skill in the art, due to the nature of the polymerization of the compounds of the present invention and the nomenclature adopted herein, in certain embodiments, a node of the present invention may further include a terminal (with respect to the node itself) three carbon alkyl group. For example, shown below is an example node of the present invention derived from glycerol wherein upon polymerization the node structure forms seven glyceryl remnant units with one terminal three carbon alkyl group labeled as $C_3H_5$ remnant below:

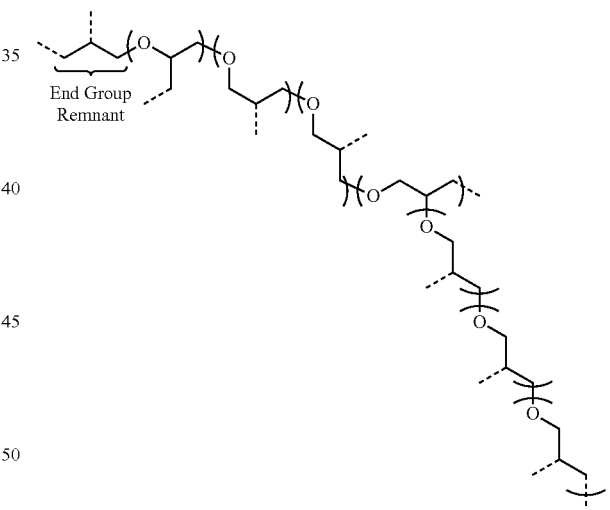

Those skilled in the art of polymer chemistry will recognize that a polyglycerol, like any typical polymer, is comprised of repeating units and end groups. In the simple case of a polymer formed by condensation of monomer units (elimination of water during polymerization), the end groups are comprised of the parent molecule while the repeating unit is derived from the parent monomer minus a water molecule. Such is the case for linear polyglycerols, which can be synthesized by using the monomer glycerol.

The polymerization of glycerol is illustrated in the figure below, where w moles of glycerol are polymerized to form a linear polyglycerol with (1−w) repeating units and 1 end group. For clarification, the end group is demarcated by hashed lines. Note that the repeating unit formula ($C_3H_6O_2$)

is equal to the glycerol unit formula ($C_3H_8O_3$) minus water ($H_2O$). Also note that the sum of the end group units [($C_3H_7O_2$) plus (OH)] equals the formula of glycerol ($C_3H_8O_3$) and that (1−w) moles of water are formed as a by-product of polymerization.

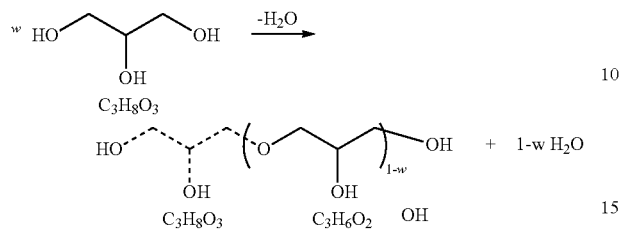

Furthermore, if this principle is carried onto the description of the dehydrated polyether (glyceryl remnant), one would find that the glyceryl repeating unit remnant would have the formula ($C_3H_5O$). Notably, the terminal remnant would have the formula ($C_3H_5$)

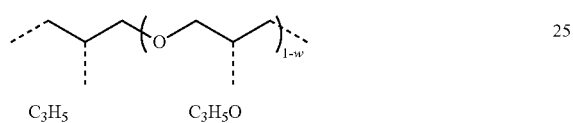

This is further illustrated in the structure below, where repeating unit isomers have been demarcated by parentheses (7 total repeat units) and the terminal glyceryl remnant demarcated by brackets (1 terminal glyceryl remnant), yielding a total DP of 8.

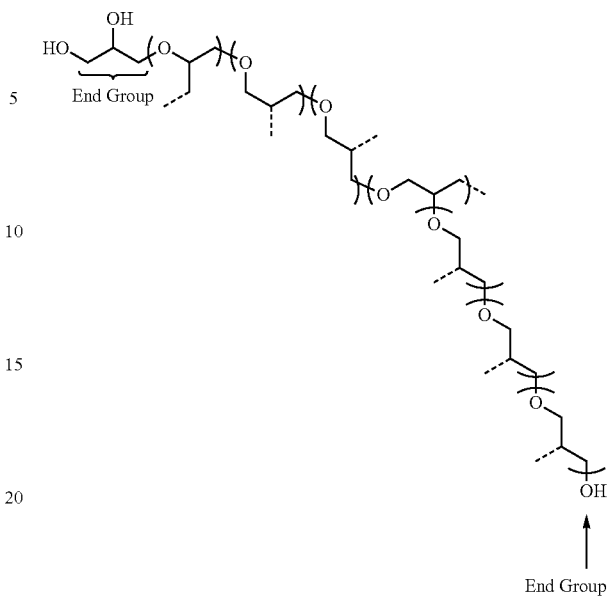

In addition to $C_3H_5$ terminal remnant units and $C_3H_5O$ remnant repeat units, there may also be $C_3H_5O_2$ remnant units and $C_3H_5O$ terminal remnant units present when the molecule is contains certain isomers containing dendritic-based cyclic units. This is illustrated below, where repeat and terminal units are demarcated by parentheses for a pentaglycerol which contains two dendritic-based cyclic units. Unless otherwise specified, the repeat and terminal remnant units are of the formula $C_3H_5O$.

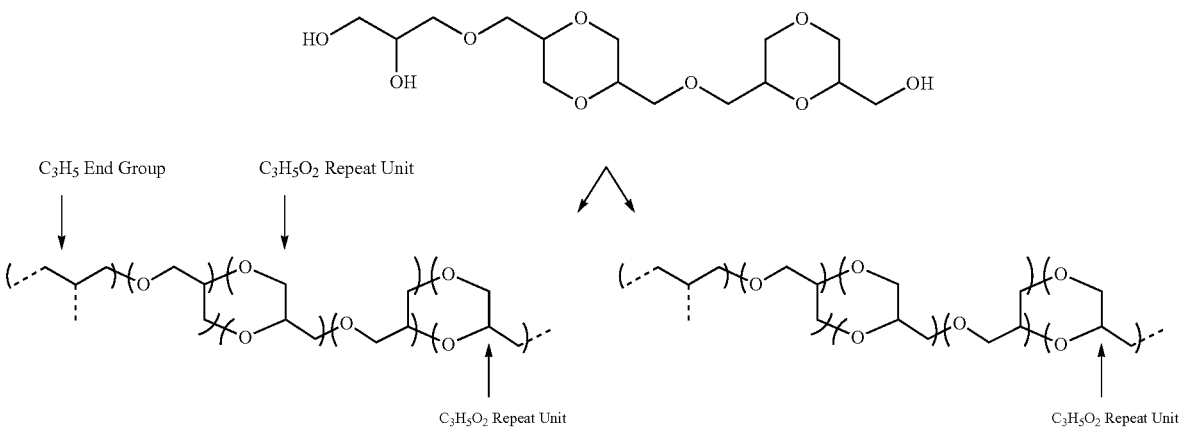

According to certain embodiments, each node structure of the present invention includes from three to about 20 glyceryl remnant units (and optionally one or more oxyalkyl units) and is capable of having from 3 to about 21 total combined groups, selected from nucleophilic groups, hydrophobic groups ($Hphob_1$), cationic groups (—$R_4$—N—[($R_5$)($R_6$)($R_7$)]), cationic hydrophobic groups (—$R_1$—N—[($R_2$)($R_3$)($Hphob_2$)]), and combinations of two or more thereof, either bonded thereto (for nucleophilic groups) or linked thereto via linking groups (for hydrophobic, cationic, and/or cationic hydrophobic groups). In certain preferred embodiments, the node structure consists only of carbon, hydrogen, and oxygen atoms from glyceryl remnant units. In certain embodiments, the node structure consists only of carbon, hydrogen, and oxygen atoms from glyceryl remnant units and oxyalkyl units. In certain embodiments, all glyceryl remnant units, and optional oxylalkyl units if any, of the node structure are contiguous. According to certain embodiments, the node structure has a ratio of carbon atoms to oxygen atoms (by number) that is from about 2.5 to about 4.5:1, or from about 2.5 to about 3.5:1, such as from about 2.6 to about 3.4:1, such as from about 2.8 to about 3.4:1.

Examples of suitable node structures are illustrated below in the description of certain specific examples of cationic polyglyceryl compounds. As one skilled in the art will readily appreciate, the polyglyceryl node structure includes a plurality of ether functional groups, and as such, the compounds may further be described as "polyethers."

As described above, the cationic polyglyceryl compounds further comprise at least one cationic group and at least one hydrophobic moiety. In some aspects, the cationic polyglyceryl compound used in the first composition of the present invention may include 8 cationic groups, which include 4 hydrophobic groups linked via four of the cationic groups. In some aspects, the cationic polyglyceryl compound used in the first composition of the present invention may include 1 cationic group, which include 1 hydrophobic group linked via the cationic group. A compound may comprise any suitable combination of one or more cationic groups, hydrophobic groups, and/or cationic hydrophobic groups (i.e. a cationic group wherein a hydrophobic moiety constitutes a portion of the cationic group) such that the compound has both at least one cationic group and at least one hydrophobic moiety. For example, in certain embodiments, a compound of the present invention may comprise one cationic hydrophobic group alone (or optionally in combination with any additional number of separate cationic groups, cationic hydrophobic groups, or hydrophobic groups), or may comprise at least one cationic group (with or without hydrophobic moieties) and at least one hydrophobic group alone (or optionally in combination with any additional number of separate cationic groups, cationic hydrophobic groups, or hydrophobic groups). In some aspects, the compound may include four cationic groups without hydrophobic groups linked thereto, four cationic groups with hydrophobic groups linked thereto, and zero hydrophobic groups without any cationic groups linked thereto. In some aspects, the compound may include one cationic group with one hydrophobic groups linked thereto, and zero hydrophobic groups without any cationic groups linked thereto.

Any suitable cationic group may be linked to the node structure via a linking group in a compound of the present invention. Suitable cationic groups may include groups bearing a positive charge, such as, for example, an amine, including a quaternary amine or a tertiary amine (in the latter case one of the R groups bonded to the nitrogen would be a hydrogen (H)). In one embodiment, the cationic moiety is a quaternary amine. Examples of preferred quaternary amines include those illustrated by the structures —$R_1$—N—[($R_2$)($R_3$)($Hphob_2$)] and —$R_4$—N—[($R_5$)($R_6$)($R_7$)], as shown in Formula I, wherein $R_1$ and $R_4$ are independently selected linear, branched, saturated or unsaturated $C_1$ to $C_6$ hydrocarbon chains that may be optionally further substituted with nucleophilic functional groups such as —OH, —SH or —$NH_2$; $R_2$, $R_5$, $R_6$, and $R_7$ are independently selected $C_1$ to $C_4$ alkyl groups ($CH_3$ to $C_4H_9$) or hydrogen (H), in some aspects methyl; $R_3$ is an independently selected $C_1$ to $C_4$ alkyl group ($CH_3$ to $C_4H_9$), hydrogen, or a hydrophobic moiety, in some aspects methyl; and $Hphob_2$ is a hydrophobic moiety. Examples of preferred $R_1$ and $R_4$ groups include $C_1$ to $C_3$ linear alkyl groups or 2-hydroxypropyl. In certain preferred embodiments, $R_1$ and $R_4$ are $CH_2CH(OH)CH_2$—. Examples of $C_1$ to $C_4$ alkyl groups include hydrogen, methyl, ethyl, propyl, isopropyl, butyl, tert-butyl, and isobutyl.

The relative amounts of cationic moieties and position on the polyglyceryl compound may vary. As such, both "b" and "c" in Formula I are each independently from zero to ten, more preferably from zero to 5, and more preferably from zero to 4, provided that the total number of cationic moieties per node structure, i.e. the sum of b and c, is from one to ten inclusive. In preferred embodiments, b is at least one. In certain preferred embodiments the sum of b and c is from one to eight.

Serving to charge balance each cationic moiety is optional anionic counterions $X_1$ and/or $X_2$. Anionic counterions $X_1$ and $X_2$ are independent organic or inorganic cosmetically acceptable anions. Typical inorganic anions are halides, sulfates, phosphates, nitrates, and borates. Most preferred are halides, especially chloride. Another suitable organic anionic counterions include methosulfate, toluoyl sulfate, acetate, citrate, taurate, glycolate, lactate, gluconate, and benzensulfonate, and the like.

Any suitable hydrophobic moieties (e.g. $Hphob_1$ and $Hphob_2$ in Formula I) may be incorporated in the compounds of the present invention. By "hydrophobic moiety," it is meant a nonpolar moiety that contains at least one of the following: (a) a carbon-carbon chain of at least six carbons in which none of the six carbons is a carbonyl carbon or has a hydrophilic moiety bonded directly to it; (b) three or more alkyl siloxy groups (—[Si(R)$_2$—O]—); and/or (c) three or more oxypropylene groups in sequence. A hydrophobic moiety may be, or include, linear, cyclic, aromatic, saturated or unsaturated groups. Preferred hydrophobic moieties include 6 or more carbon atoms, more preferably from 8 to 30 carbon atoms, even more preferably from 10 to 26 carbon atoms, and most preferably from 12 to 24 carbon atoms, with 12 carbon atoms being desired in some embodiments. Examples of hydrophobic moieties include linear or branched, saturated or unsaturated alkyl moieties, e.g. linear or branched, saturated or unsaturated $C_{10}$-$C_{30}$ alkyl, such as decyl, undecyl, dodecyl (lauryl), tridecyl, tetradecyl (myristyl), pentadecyl, hexadecyl (cetyl, palmityl), heptadecyl, heptadecenyl, hepta-8-decenyl, hepta-8,11-decenyl, octadecyl (stearyl), nonadecyl, eicosanyl, henicosen-12-yl, henicosanyl, docosanyl (behenyl), and the like as well as benzyl. Certain hydrophobic moieties include heptadecyl, heptadecenyl, hepta-8-decenyl, hepta-8,11-decenyl and the like. Other examples of hydrophobic moieties include groups such as poly(oxypropylene), poly(oxybutylene), poly(dimethylsiloxane), and fluorinated hydrocarbon groups containing a carbon chain of at least six carbons in which none of the six carbons has a hydrophilic moiety bonded directly to it, and the like. Examples of certain preferred hydrophobic moieties for Hphob$_1$ are undecyl, pentadecyl heptadecenyl, and hepta-8-decenyl, and for Hphob$_2$ are dodecyl (lauryl), cocoalkyl, and stearyl.

The relative amounts of hydrophobic moieties and position on the polyglyceryl compound may vary. As such, both "a" and "b" in Formula I are each independently from zero to ten, more preferably from zero to 5 and more preferably from zero to 3 provided that the total number of hydrophobic moieties per node structure, i.e. the sum of a and b, is from one to ten inclusive. In preferred embodiments, b is at least one. In certain preferred embodiments the sum of a and b is from one to 5, more preferably from one to 4.

The polyglyceryl compounds may have any suitable linking groups (e.g. L$_1$, L$_2$, and/or L$_3$ in Formula I) for linking cationic groups and/or hydrophobic groups to the node. By "linking to the node" it is meant that the cationic group and/or hydrophobic group is bonded to the node with only a linking group therebetween. Examples of suitable linking groups include functional moieties that when linked to at least two carbon atoms form ethers, esters, carbamates (urethanes), amides, ketones, or carbonates. That is, as will be understood by one of skill in the art, each linking group may be selected from: —O—, —OC(O)—, —OC(O)N(H)—, —C(O)N(H)—, —C(O)—, —OC(O)O—, and the like. Preferred linking groups include ether (—O—), and ester —(OC(O)—) linkages, more preferably ether linkages for linking groups L$_2$ and L$_3$ and ether or ester linkages for linking group L$_1$.

In certain embodiments, the linking group that are present (e.g. L$_1$, L$_2$, and/or L$_3$) are wholly or partially derived from a hydroxyl group of the polyglyceryl repeat units that were reacted in the process of making the cationic polyglyceryl compound/composition. For example, if a hydroxyl group present on a polyglyceryl is reacted with fatty acids under condensation reaction conditions, then the resulting node structure will have hydrophobic moieties covalently linked thereto by L$_1$ groups that are ester functional groups (—OC(O)—). According to another embodiment, the various linking groups may be derived from a difunctional reagent. For example, if a hydroxyl group on the polyglyceryl is reacted with a diisocyanate, followed by reaction with a fatty alcohol, then the resulting Z will be substituted with hydrophobic moieties covalently linked to the node structure by L$_1$ groups that are carbamate (urethane) functional groups.

The cationic polyglyceryl compounds may have any suitable nucleophilic groups bonded to the node structures. By nucleophilic groups, it is meant electron donating functional groups such as hydroxyl (—OH), amino (—NH$_2$), and thiol (—SH) groups. In a preferred embodiment each nucleophilic group is a hydroxyl group (—OH). The number of nucleophilic groups "d" directly bonded to the node structure is from 1 to about 21, preferably from 1 to about 16, and preferably from 1 to about 11.

While not intending to be limiting to any of the following structures, specific examples of compounds within the scope of the invention to further illustrate compounds of Formula I, and compositions comprising such compounds. For example, in certain embodiments a composition may comprise a cationic polyglyceryl compound N-(2-hydroxypropyl)-N,N-dimethyllauryl-1-ammonium chloride decaglyceryl ether, the idealized structure for which is shown below:

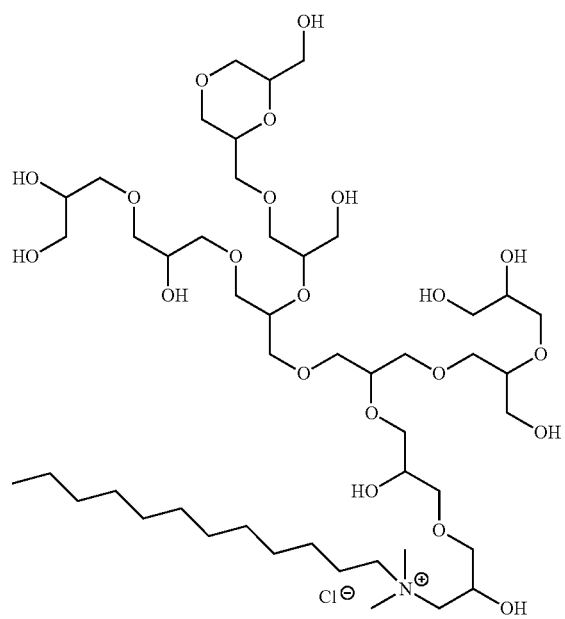 [SMILES: CCCCCCCCCCCC[N+](C)(C)CC(O)COCC(O)COC(COCC(CO)OCC(O)CO)COCC(COCC(O)COCC(O)CO)OC(CO)COCC1COCC(CO)O1 ; [Cl-]]

Wherein with reference to Formula I, (a) Z, represented by the structure below, is a decaglyceryl remnant comprised of glyceryl remnant units [with a C/O ratio of 30/10=3]

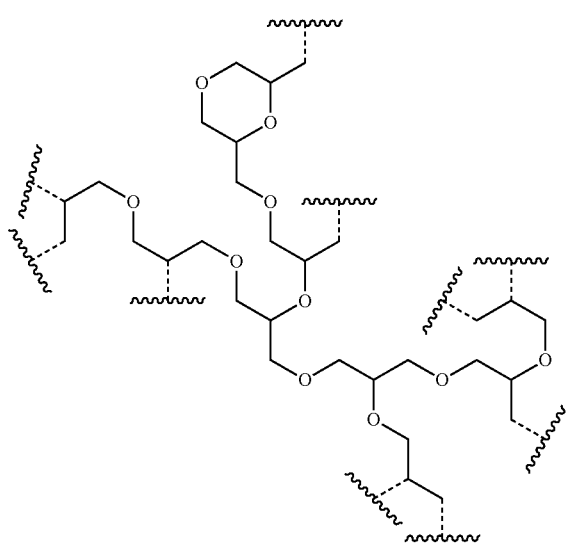

(b) d is the number of nucleophilic groups (—OH) directly attached to Z and is equal to 9
(c) L$_1$ is absent
(d) Hphob$_1$ is absent
(e) a is 0

(f) $L_2$ is an ether linking group which links Z to $R_1$

—O—

(g) $R_1$ is 2-hydroxypropyl

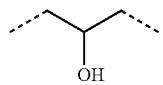

(h) N is a nitrogen species;

(i) $R_2$ is a methyl group

—CH$_3$ (j) $R_3$ is a methyl group

—CH$_3$ (k) Hphob$_2$ is a lauryl group

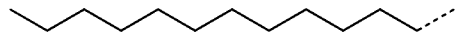

(l) $X_1$ is the counterion

Cl$^\ominus$ (m) b is 1 since there is 1 ($L_2$-$R_1$—N—[($R_2$)($R_3$)(Hphob$_2$)]) per Z
(n) $L_3$ is absent
(o) $R_4$ is absent.
(p) $R_5$ is absent
(q) $R_6$ is absent
(r) $R_7$ is absent
(s) $X_2$ is absent
(t) c is 0 since there is 0 ($L_3$-$R_4$—N—[($R_5$)($R_6$)($R_7$)]) per Z;
(u) the sum of a and b is equal to 1
(v) and the sum of b and c is 1
(w) and the sum of a, b, and c is 1.

In certain embodiments a composition may comprise a cationic polyglyceryl compound (N-(2-hydroxypropyl)-N,N-dimethyllauryl-1-ammonium) (N-(2-hydroxypropyl)-N,N,N-trimethylpropan-1-ammonium) octaglyceryl ether, the idealized structure for which is shown below:

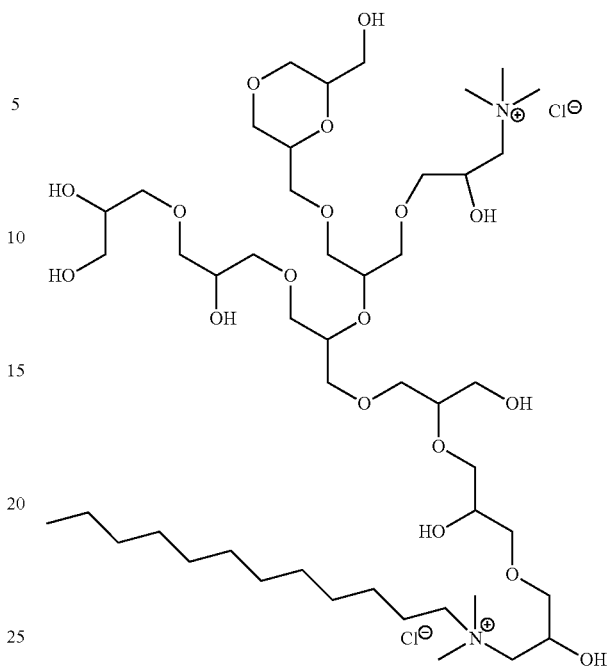

(a) Z, represented by the structure below, is a octaglyceryl remnant comprised of glyceryl remnant units [with a C/O ratio of 22/8=2.75]

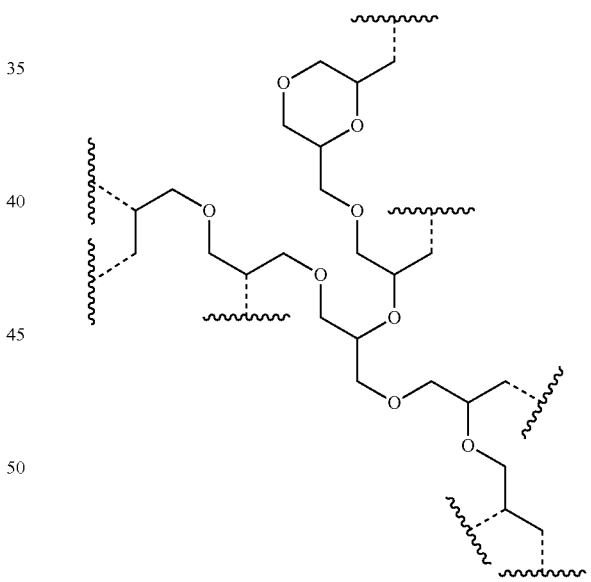

(b) d is the number of nucleophilic groups directly attached to Z and is equal to 6
(c) $L_1$ is absent
(d) Hphob$_1$ is absent
(e) a is 0 since there are no PG hydroxyls substituted with ($L_1$-Hphob$_1$)
(f) $L_2$ is an ether linking group which links Z to $R_1$

—O—

(g) $R_1$ is 2-hydroxypropyl

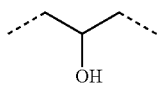

(h) N is a nitrogen species;

(i) $R_2$ is a methyl group

—$CH_3$ (j) $R_3$ is a methyl group

—$CH_3$ (k) $Hphob_2$ is a lauryl group

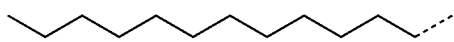

(l) $X_1$ is the counterion $Cl^{\ominus}$ (m) b is 1 since there is 1 ($L_2$-$R_1$—N—[($R_2$)($R_3$)($Hphob_2$)]) per Z (n) $L_3$ is an ether linking group which links Z to $R_4$

—O—

(o) $R_4$ is 2-hydroxypropyl

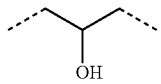

(p) $R_5$ is a methyl group

—$CH_3$ (q) $R_6$ is a methyl group

—$CH_3$ (r) $R_7$ is a methyl group

—$CH_3$ (s) $X_2$ is the counterion $Cl^{\ominus}$ (t) c is 1 since there is on average 1 ($L_3$-$R_4$—N—[($R_5$)($R_6$)($R_7$)]) per Z (u) the sum of a and b is equal to 1

(v) and the sum of b and c is 2

(w) and the sum of a, b, and c is 2.

In certain embodiments a composition may comprise a cationic polyglyceryl compound (N-(2-hydroxypropyl)-N,N-dimethylcocoalkyl-1-ammonium) decaglyceryl monooleate ether, the idealized structure for which is shown below:

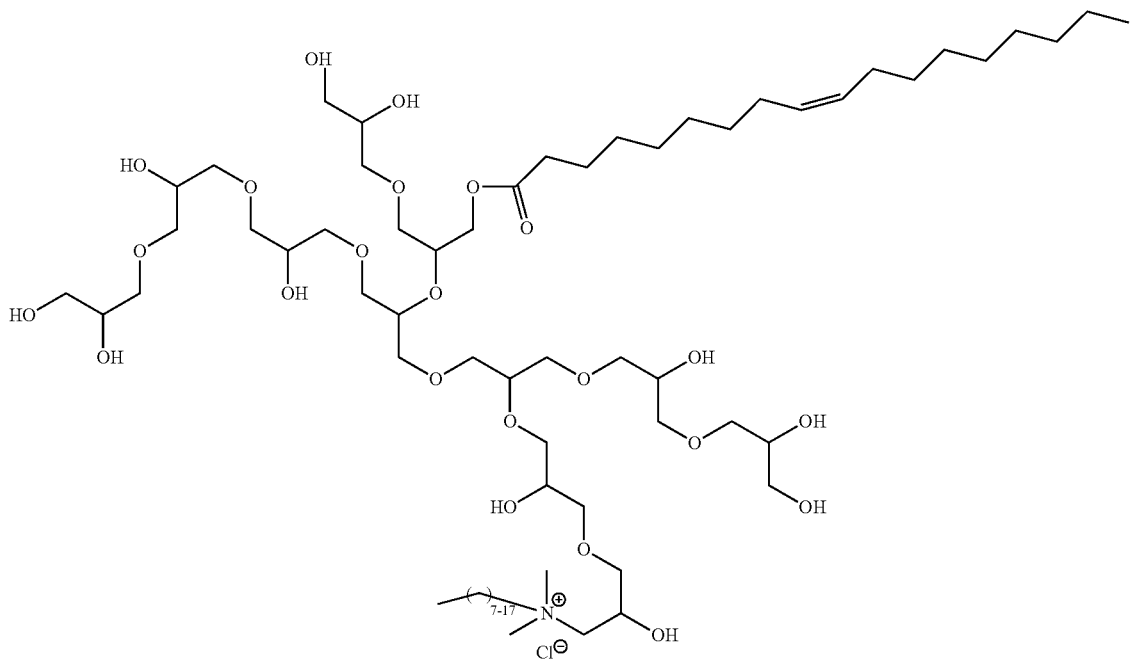

Wherein with reference to formula I,
(a) below, is a decaglyceryl remnant 10 remnant comprised of glyceryl remnant units [with a C/O ratio of 30/9=3.3]

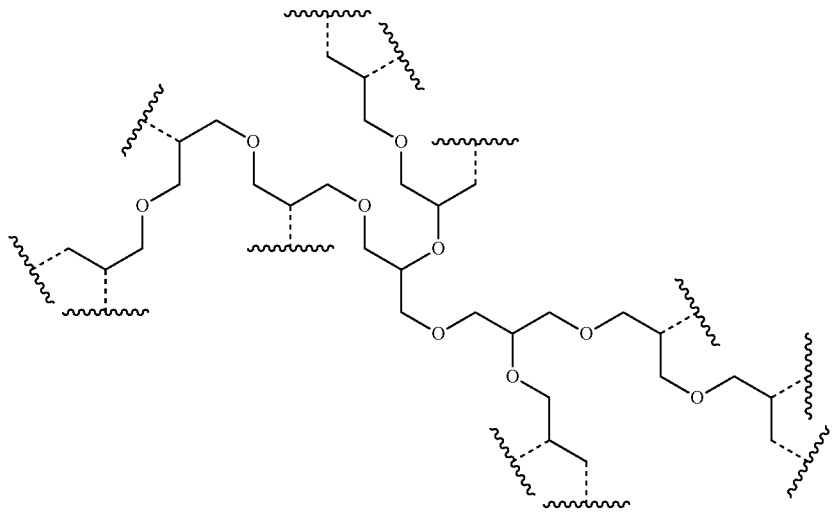

(b) d is the number of nucleophilic groups directly attached to Z and is equal to 10
(c) $L_1$ is an ester linkage

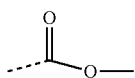

(d) Hphob$_1$ is 8-heptadecenyl

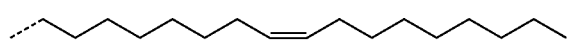

(e) a is 1 since there is 1 ($L_1$-Hphob$_1$) per Z
(f) $L_2$ is an ether linking group which links Z to $R_1$

(g) $R_1$ is 2-hydroxypropyl

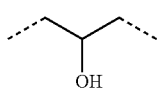

(h) N is a nitrogen species;

(i) $R_2$ is a methyl group

(j) $R_3$ is a methyl group

(k) Hphob$_2$ is cocoalkyl group which is known to those familiar in the art to be a distribution of saturated and unsaturated $C_8$-$C_{18}$ (based on the C chain distribution of coconut fatty acids from coconut oil)

(l) $X_1$ is the counterion

(m) b is 1 since there is 1 ($L_2$-$R_1$—N—[($R_2$)($R_3$)(Hphob$_2$)]) per Z
(n) $L_3$ is absent
(o) $R_4$ is absent
(p) $R_5$ is absent
(q) $R_6$ is absent
(r) $R_7$ is absent
(s) $X_2$ is absent
(t) c is 0 since there is on average 0 ($L_3$-$R_4$—N—[($R_5$)($R_6$)($R_7$)]) per Z
(u) the sum of a and b is equal to 2
(v) and the sum of b and c is 1
(w) and the sum of a, b, and c is 2.

In certain embodiments a composition may comprise a cationic polyglyceryl compound (N-(2-hydroxypropyl)-N,N-dimethyllauryl-1-ammonium) (N-(2-hydroxypropyl)-N,N,N-trimethylpropan-1-ammonium) decaglyceryl monooleate ether, the idealized structure for which is shown below:

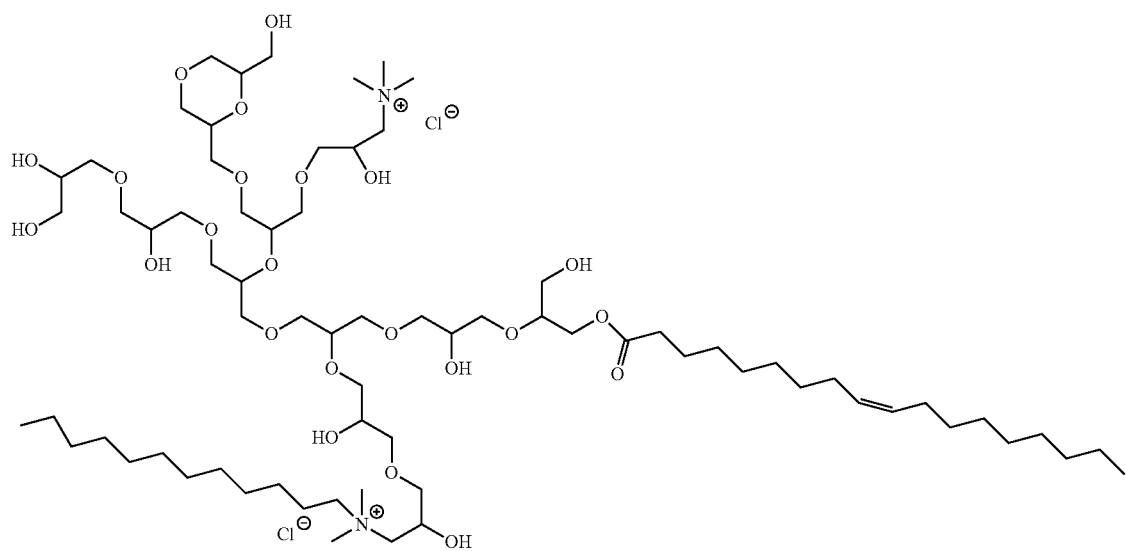 [SMILES: CCCCCCCC/C=C\CCCCCCCC(=O)OCC(CO)OCC(O)COCC(COCC(COCC(O)COCC(O)CO)OC(COCC(O)C[N+](C)(C)C)COCC1COCC(CO)O1)OCC(O)COCC(O)C[N+](C)(C)CCCCCCCCCCCC ; [Cl-] ; [Cl-]]
Wherein with reference to formula I,
(a) Z, represented by the structure below, is a decaglyceryl remnant comprised of glyceryl remnant units
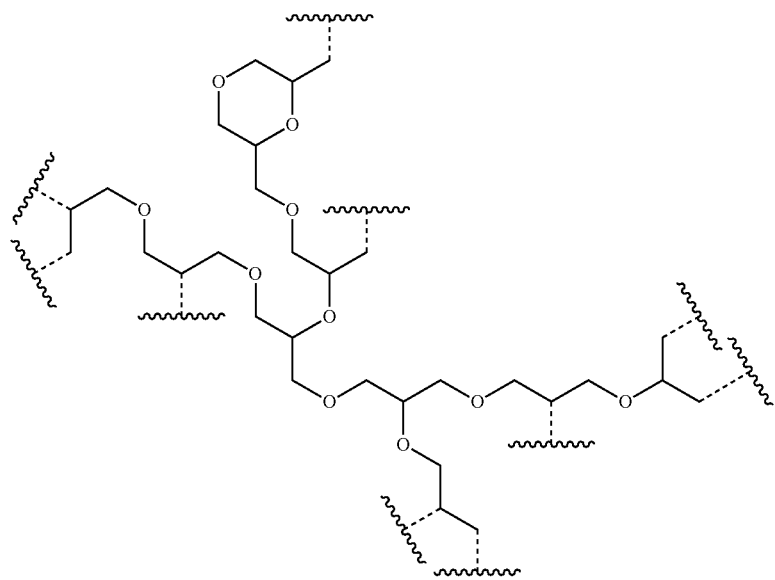
(b) d is the number of nucleophilic groups directly attached to Z and is equal to 7
(c) $L_1$ is an ester linkage
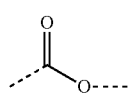
(d) $Hphob_1$ is 8-heptadecenyl
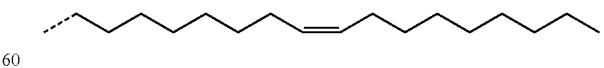
(e) a is 1 since there is 1 ($L_1$-$Hphob_1$) per Z
(f) $L_2$ is an ether linking group which links Z to $R_1$
—O—

(g) $R_1$ is 2-hydroxypropyl

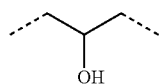

(h) N is a nitrogen species;

(i) $R_2$ is a methyl group

—$CH_3$ (j) $R_3$ is a methyl group

—$CH_3$ (k) $Hphob_2$ is cocoalkyl group which is known to those familiar in the art to be a distribution of saturated and unsaturated $C_8$-$C_{18}$

(l) $X_1$ is the counterion $Cl^\ominus$ (m) b is 1 since there is on average 1 ($L_2$-$R_1$—N—[($R_2$)($R_3$)($Hphob_2$)]) per Z (n) $L_3$ is an ether linking group which links Z to $R_4$

—O—

(o) $R_4$ is 2-hydroxypropyl

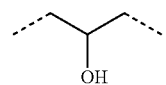

(p) $R_5$ is a methyl group

—$CH_3$ (q) $R_6$ is a methyl group

—$CH_3$ (r) $R_7$ is a methyl group

—$CH_3$ (s) $X_2$ is the counterion $Cl^\ominus$ (t) c is 1 since there is on average 1 ($L_3$-$R_4$—N—[($R_5$)($R_6$)($R_7$)]) per Z (u) the sum of a and b is equal to 2

(v) and the sum of b and c is 2

(w) and the sum of a, b, and c is 3.

In certain embodiments a composition may comprise a cationic polyglyceryl compound (N-(2-hydroxypropyl)-N,N,N-trimethylpropan-1-ammonium) decaglyceryl monooleate ether, the idealized structure for which is shown below:

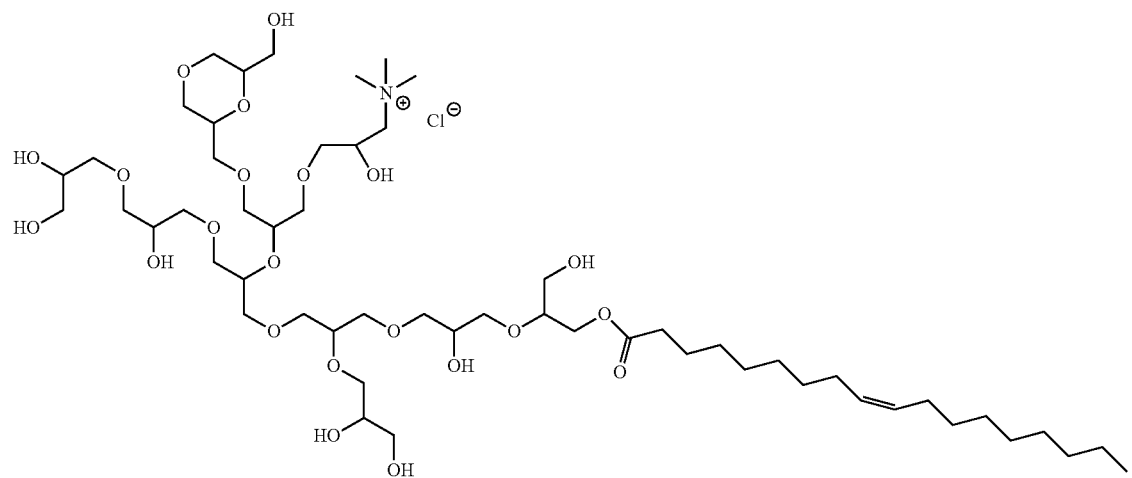 [SMILES: CCCCCCCC/C=C\CCCCCCCC(=O)OCC(CO)OCC(O)COCC(COCC(COCC(O)COCC(O)CO)OC(COCC(O)C[N+](C)(C)C)COCC1COCC(CO)O1)OCC(O)CO ; [Cl-]]

Wherein with reference to formula I,
(a) Z, represented by the structure below, is a decaglyceryl remnant comprised of glyceryl remnant units[with a C/O ratio of 30/10=3]
(b)

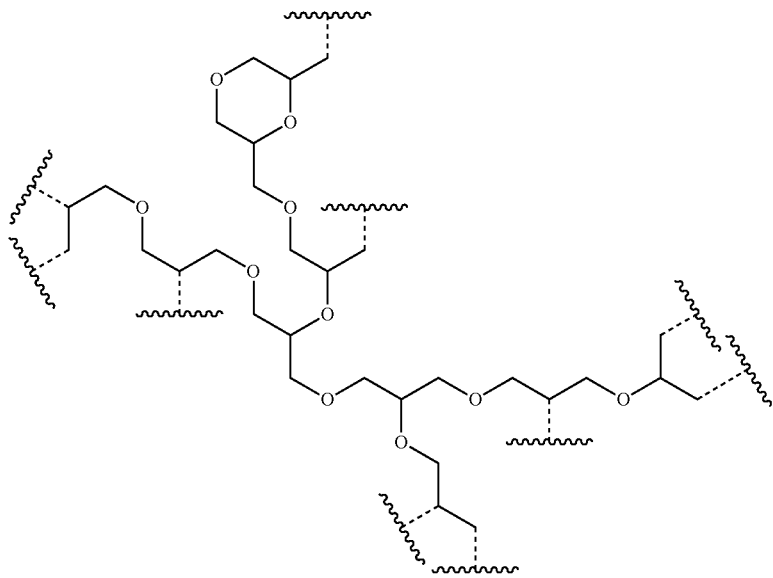

(c) d is the number of nucleophilic groups directly attached to Z and is equal to 10
(d) $L_1$ is an ester linkage

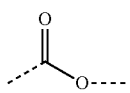

(e) $Hphob_1$ is 8-heptadecenyl

(f) a is 1 since there is on average 1 ($L_1$-$Hphob_1$) per Z
(g) $L_2$ is absent
(h) $R_1$ is absent
(i) N is a nitrogen species;

(j) $R_2$ is absent
(k) $R_3$ is absent
(l) $Hphob_2$ is absent
(m) $X_1$ is absent
(n) b is 1 since there is 1 ($L_2$-$R_1$—N—[($R_2$)($R_3$)($Hphob_2$)]) per Z
(o) $L_3$ is an ether linking group which links Z to $R_4$

—O—

(p) $R_4$ is 2-hydroxypropyl

(q) $R_5$ is a methyl group
—$CH_3$
(r) $R_6$ is a methyl group
—$CH_3$
(s) $R_7$ is a methyl group
—$CH_3$
(t) $X_2$ is the counterion
$Cl^\ominus$
(u) c is 1 since there is on average X ($L_3$-$R_4$—N—[($R_5$)($R_6$)($R_7$)]) per Z
(v) the sum of a and b is equal to 1
(w) and the sum of b and c is 1
(x) and the sum of a, b, and c is 2.

Anionic Surfactant

The cleansing system includes a Second Composition, which includes an anionic surfactant. Desirable anionic surfactants include, for example those selected from the following classes of surfactants: alkyl sulfates, alkyl ether sulfates, alkyl monoglyceryl ether sulfates, alkyl sulfonates, alkylaryl sulfonates, alkyl sulfosuccinates, alkyl ether sulfosuccinates, alkyl sulfosuccinamates, alkyl amidosulfosuccinates, alkyl carboxylates, alkyl amidoethercarboxylates, alkyl succinates, fatty acyl sarcosinates, fatty acyl amino acids, fatty acyl taurates, fatty alkyl sulfoacetates, alkyl phosphates, and mixtures of two or more thereof. Certain anionic surfactants useful in combination with the polyglyceryl compound include: sodium laureth sulfate, Ammonium Laureth Sulfate, Sodium Trideceth Sulfate, anionic "superhydrophilic amphiphilic copolymers" (SAC) as described in U.S. Pat. No. 8,258,250 B2, which is incorporated by reference herein. An example of an anionic SAC is sodium hydrolyzed potato starch dodecenylsuccinate.

The Second Composition may include the anionic surfactant in any desired amount from about 1% to about 10% by weight of the Second Composition. Preferably, the Second Composition includes an anionic surfactant in an amount of about 2-8% by weight of the Second Composition, or about 4-6% by weight of the Second Composition. In one particular embodiment, the Second Composition includes SLES in an amount of about 4% by weight of the Second Composition.

Additional Components

The First and/or Second Compositions of the present invention may comprise any of a variety of additional other ingredients used conventionally in healthcare/personal care compositions ("personal care components"). These other ingredients nonexclusively include one or more carriers, pearlescent or opacifying agents, thickening agents, emollients, conditioners or moisturizing agents, humectants, chelating agents, actives, exfoliants, and additives which enhance the appearance, feel and fragrance of the compositions, such as colorants, fragrances, preservatives, pH adjusting agents, and the like.

Compositions useful in the present invention may also include any of a variety of conventional thickening agents. Examples of such thickening agents include: electrolytes (e.g. Sodium Chloride, Ammonium Chloride, Magnesium Chloride); naturally-derived polysaccharides (e.g. Xanthan Gum, Dehydroxanthan Gum, *Cyamopsis Tetragonoloba* (Guar) Gum, *Cassia* Gum, *Chondrus Crispus* (Carrageenan) Gum, Alginic Acid and alginate gums (Algin, Calcium Alginate, etc.), Gellan Gum, Pectin, Microcrystalline Cellulose); derivatives of natural polysaccharides (e.g. Hydroxyethylcellulose, Ethyl Hydroxyethylcellulose, Cetyl Hydroxyethylcellulose, Methylcellulose, Hydroxypropylcellulose, Sodium Carboxymethylcellulose, Hydroxypropyl Methylcellulose, Hydroxypropyl Guar, Carboxymethyl Hydroxypropyl Guar, C18-22 Hydroxylalkyl Hydroxypropyl Guar); alkali-swellable emulsion (ASE) polymers (e.g. Acrylates Copolymer, available under the trade name Carbopol® AQUA SF-1 from Noveon Consumer Specialties, Brecksville, Ohio, and Acrylates Copolymer available under the trade name Aculyn™ 33 from Dow Personal Care, Spring House, Pa.); hydrophobically-modified alkali-swellable emulsion (HASE) polymers (e.g. Acrylates/Steareth-20 Methacrylate Copolymer, Acrylates/Steareth-20 Methacrylate Crosspolymer, and Acrylates/Ceteth-20 Itaconate Copolymer); hydrophobically-modified acid-swellable emulsion polymers (e.g. Acrylates/Aminoacrylates/C10-30 Alkyl PEG-20 Itaconate Copolymer and Polyacrylate-1 Crosspolymer); hydrophobically-modified acrylate crosspolymers, such as Acrylates C10-30 Alkyl Acrylates Crosspolymer, available under the trade name Carbopol® 1382 from Lubrizol Corp., Brecksville, Ohio; and hydrophobic non-ethoxylated micellar thickeners (e.g. Glyceryl Oleate, Cocamide MIPA, Lauryl Lactyl Lactate, or Sorbitan Sesquicaprylate).

Any of a variety of skin and/or hair conditioning or moisturizing agents in addition to the cationic polyglyceryl compositions are suitable for use in this invention. Examples include: cationic surfactants (e.g. Cetrimonium Chloride, Stearamidopropyl Dimethylamine, Distearyldimonium Chloride, Lauryl Methyl Gluceth-10 Hydroxypropyldimonium Chloride); cationic polymers (e.g. cationically-modified polysaccharides, including Polyquaternium-10, Polyquaternium-24, Polyquaternium-67, Starch Hydroxypropyltrimonium Chloride, Guar Hydroxypropyltrimonium Chloride, and Hydroxypropyl Guar Hydroxypropyltrimonium Chloride, and cationic polymers derived from the (co)polymerization of ethylenically-unsaturated cationic monomers with optional hydrophilic monomers, including Polyquaternium-5, Polyquaternium-6, Polyquaternium-7, Polyquaternium-11, Polyquaternium-14, Polyquaternium-15, Polyquaternium-28, Polyquaternium-39, Polyquaternium-44; Polyquaternium-76); silicones and silicone derivatives (e.g. Dimethicone and derivatives thereof, such as alkyl-, polyalkyloxy-, cationically-, anionically-modified dimethicone (co)polymers); and emollients (e.g. Caprylic/Capric Triglycerides, Mineral Oil, Petrolatum, Di-PPG-2 Myreth-10 Adipate).

Any of a variety of humectants in addition to the cationic polyglyceryl compositions, which are capable of providing moisturization and conditioning properties to the personal cleansing composition, are suitable for use in the present invention. Examples of suitable humectants nonexclusively include polyols, such as Glycerin, Propylene Glycol, 1,3-Propanediol, Butylene Glycol, Hexylene Glycol, polyglycerins (e.g. Polyglycerin-3, Polyglyceryn-6, Polyglycerin-10), polyethylene glycols (PEGs), and polyoxyethylene ethers of methyl glucose, such as Methyl Gluceth-10 and Methyl Gluceth-20.

Examples of suitable chelating agents include those which are capable of protecting and preserving the compositions of this invention. It may be desired that the chelating agent be ethylenediamine tetraacetic acid ("EDTA"), including Tetrasodium EDTA, or be Tetrasodium Glutamate Diacetate.

Suitable preservatives include, for example, organic acids, parabens (e.g. Methylparaben, Ethylparaben, Propylparaben, Butylparaben, Isobutylparaben), quaternary ammonium species (e.g. Quaternium-15), phenoxyethanol, DMDM hydantoin, Diazolidinyl Urea, Imidazolidinyl Urea, Iodopropynyl Butylcarbamate, Methylisothazolinone, Methylchloroisothizaolinone, Benzyl Alcohol, Caprylyl Glycol, Decylene Glycol, Ethylhexylglycerin, and Gluconolactone. Preferred are organic acid preservatives that comprise at least one carboxylic acid moiety and are capable of preserving a composition of the present invention against microbial contamination Examples of suitable organic acids include Benzoic Acid and alkali metal and ammonium salts thereof (e.g. Sodium Benzoate and the like), Sorbic Acid and alkali metal and ammonium salts thereof (e.g. Potassium Sorbate and the like), p-Anisic Acid and alkali metal and ammonium salts thereof, Salicylic Acid and alkali metal and ammonium salts thereof, and the like. In certain embodiments, the organic acid preservative comprises Benzoic Acid/Sodium Benzoate, Sorbic Acid/Potassium Sorbate, or combinations thereof.

The pH of the composition may be adjusted to the appropriate value using any number of cosmetically acceptable pH adjusters, including: alkali metal and ammonium hydroxides (e.g. Sodium Hydroxide, Potassium Hydroxide), alkali metal and ammonium carbonates (e.g. Potassium Carbonate), organic acids (e.g. Citric Acid, Acetic Acid, Glycolic Acid, Lactic Acid, Malic acid, Tartaric Acid), and inorganic acids (e.g. Hydrochloric Acid, Phosphoric Acid), and the like. In certain embodiments, the pH is adjusted to be from 3 to 10, or from 5 to 9, including from 6 to 8. In certain embodiments, the electrolyte concentration of the composition is less than 10% by weight, less than 5%, or less than 2%.

Dispensing Apparatus

As described above, the First Composition and the Second Composition are desirably separately contained in storage units until use. It is desired that the First Composition and the Second Composition be maintained either in separate storage and dispensing devices, or in a single storage and dispensing device, in either way, the First and Second Compositions are maintained in separate and discrete chambers for separately storing and dispensing the First Composition and the Second Composition. It is important that the First Composition and the Second Composition be stored in such a way that they are not combined until use. The chambers may be connected to each other or may be separate from each other. It is further desired that the storage and dispensing devices (or single device) be capable of dispensing each of First and Second Compositions in a foamed manner. The dispensing devices can be pressurized or non-pressurized, with or without propellant, may be handheld or tabletop devices. For example, one useful dispenser is a dual foam pack by Albéa Beauty Solutions USA, LLC, which includes two separate chambers to house compositions, each of which are dispensed concurrently in a side-by-side fashion, where the two compositions are combined (but not mixed) upon being dispensed from the container. Another example of a device useful includes handheld single foam pumps (known as the F2, F3, M3 handheld single foam pumps) by Frapak Packaging B.v. Yet another example of a useful dual chamber device includes the Dual Chamber Pump Bottle BJW-40 by Gidea Packaging Co. Ltd. These are merely examples of devices that may be useful in the present invention, any single chamber dispensing device or dual chamber dispensing device may be useful as described herein.

Method of Cleansing Skin

In certain embodiments, the cleansing system produced via the present invention is preferably used as or in healthcare products for treating or cleansing at least a portion of a mammalian body, for example, the human body. While the cleansing system may be applied to the skin by the user's hand, other methods of applying to skin may be used. The cleansing system may further include a substrate onto which the First Foamed Composition and Second Foamed Composition are applied for use on the body. Examples of suitable substrates include a wipe, pouf, sponge, and the like as well as absorbent articles, such as a bandage, sanitary napkin, tampon, and the like.

The present invention provides methods of treating and/or cleansing the human body comprising contacting at least a portion of the body with the First Foamed Composition and Second Foamed Composition as described above, to combine the Foamed Compositions. The method includes one or more of the steps of dispensing each of the First Composition and Second Composition in the form of a First Foamed Composition and Second Foamed Composition, respectively, combining the First Foamed Composition and Second Foamed Composition to form a Foamed Combined Composition, applying the Foamed Combined Composition to a target area of skin or hair, the Foamed Combined Composition becoming a Reduced Foam Composition, and rinsing the Reduced Foam Composition from the target area of skin or hair. The method includes a number of benefits, including improved conditioning and/or cleansing, improved sensorial profiles, easy rinse from the skin, visual cue(s) to rinse the product off of the skin (e.g., reduced foam profile), and improved resulting skin feel.

It may be desired that each of the First and Second Compositions be dispensed from a device concurrently but through separate dispensing channels, where the Compositions contact each other upon being dispensed from the device. As noted above, other methods of combining the First and Second Foamed Compositions are contemplated, including dispensing separately and combining after dispensing is completed. Certain methods comprising contacting region or regions of the skin and/or hair with the Foamed Combined Composition of the present invention to cleanse such region and/or treat such region for any of a variety of conditions including, but not limited to, acne, wrinkles, dermatitis, dryness, muscle pain, itch, and the like. In some embodiments, the contacting step comprises applying the Foamed Combined Composition of the present invention to the desired region of the user's skin and/or hair, and in other embodiments, the contacting step comprises applying the First Foamed Composition and the Second Foamed Composition to the desired region of the user's skin and/or hair separately, such that they are combined during the application step. The cleansing methods of the present invention may further comprise any of a variety of additional, optional steps associated conventionally with cleansing hair and skin including, for example, lathering and rinsing steps.

After the Foam Retention Period, the Foamed Combined Composition turns into a Reduced Foam Composition, which may either continue to be applied to the skin or hair, or may be rinsed from the user's body. As noted, the reduction in foam may serve as a visual cue to the user that the composition has been applied to the target area, and may be rinsed from the area.

In one aspect, there is a method of using a First and Second Foamed Compositions to cleanse the body. First, the First and Second Foamed Compositions are each individually provided to the user, such as through dispensing from a device or devices as described above. The device may be a dual-chamber device, or it may include two separate devices dispensing each individual Foamed Composition, either concurrently or sequentially. The First and Second Foamed Composition are then dispensed and applied to the skin region of the user, either simultaneously or after being combined by the user. After the Foam Retention Time, the combined foamed compositions then experience foam reduction, resulting in a perceivable breakage of foam and yielding a Reduced Foam Composition.

The amount of foam may be measured in any desired fashion. In one method, the foam volume of any or all compositions set forth herein may be measured by the High Shear Foam Mixing Test (described below). It may be desired that the foam volume of the Reduced Foam Composition be no greater than about 70% of the initial foam volume of the Foamed Combined Composition, or no greater than about 50% of the initial foam volume of the Foamed Combined Composition, or no greater than about 30% of the initial foam volume of the Foamed Combined Composition, or no greater than about 20% of the initial foam volume of the Foamed Combined Composition. The resulting composition having no greater than about 70%, 50%, 30% or 20% of the initial foam volume of the Foamed Combined Composition is referred to herein as the Reduced Foam Composition, which may either be continued to be applied to the skin region of the user or may be rinsed from the user's skin. After rinsing the Reduced Foam Composition from the skin region of the user, the skin region is cleansed while providing the user with a desired skin feel, as described above.

As set forth above, there are a number of parameters that may help define the compositions and methods of the present invention. One parameter is the Initial Foam Volume, as set forth above. Another parameter includes the charge mol ratio of the anionic and cationic surfactants. Desirably, the charge mol ratio is between about 0.2 and about 1.7, and more specifically, including those charge mol ratios seen throughout the Examples. Another parameter includes the total surfactant weight percent. The total surfactant weight percentage is the average weight of the surfactants within each of the First and Second Foamed Compositions. Desirably, the total surfactant weight percent is between about 2% to about 15%, or from about 3% to about 10%, or from about 3% to about 7%. Another parameter includes the foam volume of the Reduced Foam Composition, as measured after 10 seconds, or after 20 seconds, or after 30 seconds after combination, as described above. The desired foam volume of the Reduced Foam Composition is less than about 70% of the Initial Foam Volume of the Foamed Combined Composition, or less than about 50% of the Initial Foam Volume of the Foamed Combined Composition, or less than about 30% of the Initial Foam Volume of the Foamed Combined Composition. Another parameter that may be considered is the Foam Retention Period, which is desirably less than about 30 seconds after the formation of the Foamed Combined Composition, or less than about 20 seconds after the formation of the Foamed Combined Composition, or less than about 10 seconds after the formation of the Foamed Combined Composition. Another parameter may include the rinsing time after formation of the Reduced Foam Composition, where the rinsing time may be less than 20 seconds, or less than 10 seconds, or less than 5 seconds. The present invention may include or be defined by one or more of these parameters set forth above.

EXAMPLES

The following examples are meant to illustrate the present invention, not to limit it thereto. Test methods used in the Examples are described as follows:

Initial Foam Volume Upon Dispensing from a Foam Pump:

Measurements of initial foam volume generated through a foam pump system were made using the following procedure. First, 5 g each of cleansing compositions were added to the 2 chambers of the foam pump system. The foam pump system used is a 3M Dual Chamber Mini Foam Pump (3M DCMF Pump). Foam is generated by dispensing 2 pumps (one pump per chamber) of foam at a temperature of 20 degree Celsius+/−2 degree Celsius in accordance with the use instructions of the foam pump system. The foam is dispensed into a graduated, cone-shaped volumetric measurement device with a volume of 100 milli liter (mL) and the foam volume is determined 5 seconds after dispensing. The 2 chambers may contain the same cleansing composition or two different cleansing compositions. It is assumed that within the 5 seconds foam aging and mixing of the foams does not impact the determined initial foam volume.

The Initial Foam Volume upon dispensing from a foam pump is recorded in milli-liter (mL). Accuracy of the determined volume is +/−0.5 mL. Foam volume less than 0.5 mL is recorded as 0.

Rotational Cylinder Foam Test:

Assessment of the foaming performance of different compositions may also be determined with the rotational cylinder foam test. Here, foam is generated through a rotating cylinder filled with composition and air (and not through the foam pump system). First, 100 mL of cleansing composition is added to a 1000 mL graduated glass cylinder. The glass cylinder is sealed with a cap. At 20° C., the cylinder is continuously rotated (top to bottom) with a frequency of 1 s$^{-1}$. After every 5 rotations, the cylinder is stopped and the total volume (liquid+foam) is recorded after 5 seconds and then the rotations resume.

The Rotational Cylinder Foam Volume is recorded in milli-liter (mL). Accuracy of the determined volume is +/−10 mL. The foam volume measured is the sum of volume of liquid and volume of foam.

Hand-Use Foam Application Test:

Measurements of foaming performance at in-use conditions were made using the following procedure. First, 5 g each of cleansing compositions were added to the 2 chambers of the foam pump system. The foam pump system is a 3M Dual Chamber Mini Foam Pump (3M DCMF Pump). Foam is generated by dispensing 2 pumps (one pump per chamber) of foam at a temperature of 20 degree Celsius+/−2 degree Celsius in accordance with the use instructions of the foam pump system. The foam is dispensed into the palm of a dry left hand. The other hand is wetted and then the foam is distributed between the hands by rotating motions of the palms against each other; 20 rotations in 10 seconds. This also ensures mixing of foams coming from the 2 chambers. Foam characteristic (foam amount, bubble size, foam texture) is assessed and images are taken directly after dispensing of the foam and after the 10 second distribution process.

If the same composition is used in both chambers, the concentrations of the components of one composition do not change when dispensed and mixed with the foam of the other chamber's foam. When 2 different compositions are used, the concentrations of the components of one composition are reduced to half of the initial value when dispensed and mixed with the foam of the other chamber's foam (the mass of foam dispensed from each chamber was tested to be consistent within +/−5% and therefore, equal foam mass is assumed to be dispensed from both chambers per pump).

Sensory Panel Evaluation:

Sensorial attributes of the cleansing compositions during use were measured as follows. Assessments are blinded and with random order of samples per subject. Each of the 6 subjects washed hands with an alkaline bar soap (such as Ivory® soap) using tap water to ensure equivalent baseline values. Two pumps (one pump per chamber) of foam are dispensed into one wet hand and the foam is distributed throughout both hands over a time of 10 seconds. Hands are rinsed with tap water until hands feel rinsed. Each subject assesses the following 2 parameters right before rinsing and throughout the rinsing process: 1) Conditioning on a scale of 1-5, with 5 indicating highest level of conditioning; 2) Softness on a scale of 1-5, with 5 indicating highest level of softness. Data are represented as the number average of the subjects. The standard deviation (STD) is calculated from the data using the Excel® function STDEV.P. STDEV.P uses the following formula:

$$\sqrt{\frac{\sum (x - \bar{x})^2}{n}},$$

where $\bar{x}$ is the sample mean average and n is the sample size.

High-Shear Foam Mixing Test:

Assessment of foam volume after mixing of foam generated from 2 compositions is done with the high-shear foam mixing test. Foam is generated through a 3M Dual Chamber Mini Foam Pump (3M DCMF Pump) foam pump system. 5 g each of cleansing compositions were added to each of the chambers. Foam is generated by dispensing 10 pumps (5 pumps per chamber) of foam at a temperature of 20 degree Celsius+/−2 degree Celsius in accordance with the use instructions of the foam pump system. The foam is dispensed into a graduated volumetric measurement device with a volume of 200 mL and the initial foam volume is determined 5 seconds after dispensing. The foams from the two chambers are then homogenized/mixed using a Polytron PT 3100D Homogenizer with a PT-DA 3020/2 EC Generator for 60 seconds at 13,900 rpm. The mixed foam volume is measured and recorded. This foam mixing test is an adequate indication of in-use foam performance (see e.g. Hand-use Foam Application Test) and allows screening of several combinations with varying molar charge ratios of anionic to cationic surfactant. After foam mixing, a reduction to ~70% of the initial foam volume is considered sufficient to indicate a consumer-perceivable difference in foam volume.

Preparation of Compositions of Inventive Examples and Comparative Examples

Compositions of Inventive Examples and Comparative Examples were prepared utilizing different types of formulation ingredients (i.e. raw materials from various suppliers). Ratios of cationic and anionic surfactants are described herein in terms of molar ratios, unless expressly noted otherwise. These materials, along with INCI/chemical names, abbreviations, trade names and suppliers are listed below:
Anionic Surfactants:
  Sodium laureth sulfate (SLES) was obtained from Solvay as Rhodapex® ES-2K.
  Sodium trideceth sulfate was obtained from Solvay as Rhodapex® EST-65.
  Sodium methyl cocoyl taurate was obtained from Croda as Adinol™ CT24 MBAL.
  Sodium cocoyl isethionate was obtained from Clariant as Hostapon® SCI-85 C.
  Sodium hydrolyzed potato starch dodecenylsuccinate was obtained from Akzo Nobel.
Amphoteric/Zwitterionic Surfactants:
  Cocamidopropyl betaine (CAPB) was obtained from Evonik Inc. as Tego® Betain F50.
Cationic surfactants:
  Hydrophobically modified, cationic polyglycerols (G1 and G6) were obtained from Lonza.
  Laurtrimonium chloride was obtained from Pilot Chemical as Maquat® LATAC-30%.
  Cocamidopropyl dimethylamine was obtained from Lubrizol as Schercodine™ C.
Other:
  Cationic polymer guar hydroxypropyltrimonium chloride was obtained from Solvay as Jaguar® C-17.
  Deionized water (DI water) was obtained from a Millipore Direct-Q™ System with Progard™ 2 filter.
  Used tap water had a pH of 6 and a moderate hardness of ~100 mg/L (calcium carbonate).
  Johnson's® Baby Shampoo was obtained in August 2015 through standard retail channel. The INCI ingredient list is: Water, PEG-80 Sorbitan Laurate, Cocamidopropyl Betaine, Sodium Trideceth Sulfate, PEG-150 Distearate, Phenoxyethanol, Glycerin, Citric Acid, Fragrance, Sodium Benzoate, Tetrasodium EDTA, Polyquaternium-10, Ethylhexylglycerin, Sodium Hydroxide, Potassium Acrylates Copolymer, Yellow 6, Yellow 10.
Unless otherwise indicated, all ingredient products as received were added in amounts such that the compositions contain resulting weight percent amounts of active material. For example, 9 wt % active of SLES corresponds to 34.6 wt % Rhodapex® ES-2K, which has an activity of 26%; as 9 wt %/26%=34.6 wt %.

Preparation of Compositions Used in Inventive Examples E1-E22 and Comparative Examples C1-C3 and C6-C33

Compositions used for Inventive Examples E1-E22 and Comparative Examples C1-C3 and C6-C33 were prepared as follows: To an appropriately sized vessel equipped with an overhead mechanical stirrer and a hot plate, the required amount of DI water and anionic surfactant or cationic surfactant were added and mixed at 200-250 rpm until the mixture was homogeneous. If required, the mixture is heated to above the melting point of the used surfactant until the mixture was homogeneous and then allowed to cool to room temperature. For C3, C8, and C11, aqueous solutions of anionic surfactant were added to the water-cationic surfactant mixture. Then, pH value was measured before composition being discharged to an appropriate storage vessel.

Preparation of Composition Used in Comparative Example C4

Composition used for Comparative Example $C_4$ was prepared as follows: To an appropriately sized vessel equipped with an overhead mechanical stirrer, the required amount of DI water was added. Johnson's® Baby Shampoo (JBS) was added and mixed at 200-250 rpm until the mixture was homogeneous. pH value was measured before composition being discharged to an appropriate storage vessel.

Preparation of Composition Used in Comparative Example C5

Composition used for Comparative Example $C_5$ was prepared as follows: To an appropriately sized vessel equipped with an overhead mechanical stirrer, the required amount of DI water was added. Under stirring at 400 rpm, cationic guar gum (Jaguar® C17) was slowly added and mixed until dispersed evenly. Then, zwitterionic surfactant CAPB was added and mixed at 200-250 rpm until the mixture was homogeneous. Then, anionic surfactant was added and mixed at 200-250 rpm until the mixture was homogeneous. pH value was measured before composition being discharged to an appropriate storage vessel.

Example 1a

Initial Foam Volume Upon Dispensing from a Foam Pump: Inventive (E1-E2) and Comparative Examples (C1-C5)

Example 1a shows that compositions of the invention used according to the method of use of the invention have good initial foam behavior in line with typical high foaming cleanser compositions. The Example demonstrates that the present invention allows the use of surfactants in a combination which have previously not shown desirable foaming behavior and do not show desirable foaming behavior in Comparative Examples.

Compositions of Comparative Examples C1-C5 and Inventive Examples E1-E2 are listed in Table 1a. Foam from compositions is generated simultaneously via a dual chamber foam pump. The 2 chambers contain either the same composition or 2 different compositions as indicated in Table 1a for each of the examples. The initial level of foam upon dispensing the two foamed compositions is measured according to the described Initial Foam Volume upon Dispensing from a Foam Pump test.

Measured initial foam volumes are listed in Table 1a and shown in FIG. 1a. Example C1 uses only anionic surfactant and shows high foam volume (above 5 mL). Example C2 uses only cationic surfactant and shows high foam volume. The same behavior is found for C4, a commercial cleanser (JBS) using a combination of anionic surfactant, zwitterionic surfactant and nonionic surfactant. This cleanser also contains cationic polymer, but no cationic surfactant. The same behavior is also found for C5, a cleanser using a combination of anionic surfactant, zwitterionic surfactant and cationic polymer, but no cationic surfactant. Example C3, however, uses a combination of anionic surfactant and cationic surfactant (in both chambers). The initial foam volume for this composition is lower than the level seen in inventive examples (e.g., below 5 mL). It is to be noted that a comparison of the initial foam volume of C1, C2, and C3 shows that a combination of foaming anionic surfactant (like SLES, C1) and foaming cationic surfactant (like G6, C2) leads to a low to non-foaming composition (C3).

Inventive Examples E1 and E2 show high initial foam volume (above 5 mL) even though each of E1 and E2 use anionic and cationic surfactants. This is achieved by separation of the two surfactant types using two chambers, with contact only upon dispensing from the chambers in which they are housed.

achieve high initial foam volume comparable to current foaming cleansers. In contrast, as shown in Comparative Example C3, some combinations of anionic and cationic surfactants used to generate foam conventionally may have a detrimental effect on initial foam generation, yielding a low initial foam volume. Put another way, typically, combinations of anionic and cationic surfactants when combined and dispensed through the same chamber did not generate a desired initial foam volume.

Example 1b

Rotational Cylinder Foam Test of Comparative Examples (C6-C8)

Example 1b generalizes the foaming behavior of compositions used in C1, C2, and C3, respectively, by using a different methodology of foam generation, confirming that anionic and cationic surfactants that are already combined in a composition do not foam well.

Compositions of Comparative Examples C6-C8 are listed in Table 1b. Foam is generated and volume measured according to the described Rotational Cylinder Foam Test. Measured volumes are shown FIG. 1b. Example C6 uses only anionic surfactant and shows increasing foam volume with number of rotations and the foam volume is seen to be high (above 250 mL). Example C7 uses only cationic surfactant and shows increasing foam volume with number of rotations and the foam volume is seen to be high (above 250 mL). Example C8 on the other hand uses a combination TABLE 1a Comparative Examples C1-C5 and Inventive Examples E1-E2

| | | wt % active material | | | | | | |
|---|---|---|---|---|---|---|---|---|
| Material | Material class | C1 | C2 | C4 | C5 | C3 | E1 | E2 |
| | | | | | | Chamber 1/Chamber 2 | | |
| Sodium Laureth Sulfate | Anionic surfactant | 2/2 | —/— | na/na | 2/2 | 2/2 | 4/— | 2/— |
| G6 | Cationic surfactant | —/— | 8/8 | na/na | —/— | 8/8 | —/16 | —/8 |
| Cocamidopropyl Betaine | Amphoteric/ zwitterionic surfactant | —/— | —/— | na/na | 1/1 | —/— | —/— | —/— |
| Guar Hydroxypropyltrimonium Chloride | Cationic polymer | —/— | —/— | na/na | 0.2/0.2 | —/— | —/— | —/— |
| JBS | Commercial cleanser | na/na | na/na | 25/25 * | na/na | na/na | na/na | na/na |
| Water | Vehicle | q.s. to 100 wt % | q.s. to 100 wt % | q.s. to 100 wt % | q.s. to 100 wt % | q.s. to 100 wt % | q.s. to 100 wt % | q.s. to 100 wt % |
| pH | | 5-6 | 5-6 | 5-6 | 5-6 | 5-6 | 5-6 | 5-6 |
| Initial Foam Volume (mL) | | 10 | 8 | 8 | 8 | 2 | 9 | 8 |

* a dilution of 1:3 with water was chosen for JBS to generate comparable active levels of surfactant vs examples C1-C3, C5, E1-E2.

As shown in FIG. 1a and as summarized above, Inventive Examples E1 and E2 exhibit a high initial foam volume, even the resulting foamed combined composition includes both anionic and cationic surfactants. The graph depicts that the initial foam volume for E1 and E2 is comparable to that of compositions comprising of only anionic or cationic surfactants, such as C1 and C2, respectively. Further, the initial foam volume for E1 and E2 is even comparable to typical foam rich anionic surfactant-based foaming cleanser compositions, such as C4 and C5. This illustrates that a combination of anionic and cationic surfactant used to generate foam according to the present invention allows to of anionic surfactant and cationic surfactant. The volume for this composition is lower (below 250 mL) and does not increase with number of rotations as seen for C6 and C7. This shows that a combination of foaming anionic surfactant (such as SLES, as in C6) and foaming cationic surfactant (such as G6, as in C7) leads to a low to non-foaming composition (as in C8). The rotational cylinder foam test generates foam in a different way compared to the foam pump and it assesses ability of foam generation of compositions in a continuous way (number of rotations). The observed foaming behavior is in line with the observations made with the Dual Foam Pump Test: a combination of foaming anionic surfactant and foaming cationic surfactant leads to a low to non-foaming composition.

TABLE 1b

Comparative Examples C6-C8

| Material | Material class | wt % active material | | |
|---|---|---|---|---|
| | | C6 | C7 | C8 |
| Sodium Laureth Sulfate | Anionic surfactant | 4 | — | 2 |
| G6 | Cationic surfactant | — | 16 | 8 |
| Water | Vehicle | q.s. to 100 wt % | q.s. to 100 wt % | q.s. to 100 wt % |
| | pH | 5-6 | 5-6 | 5-6 |
| | Volume at 50 rotations (mL) | 600 | 300 | 155 |

Figure 1B:
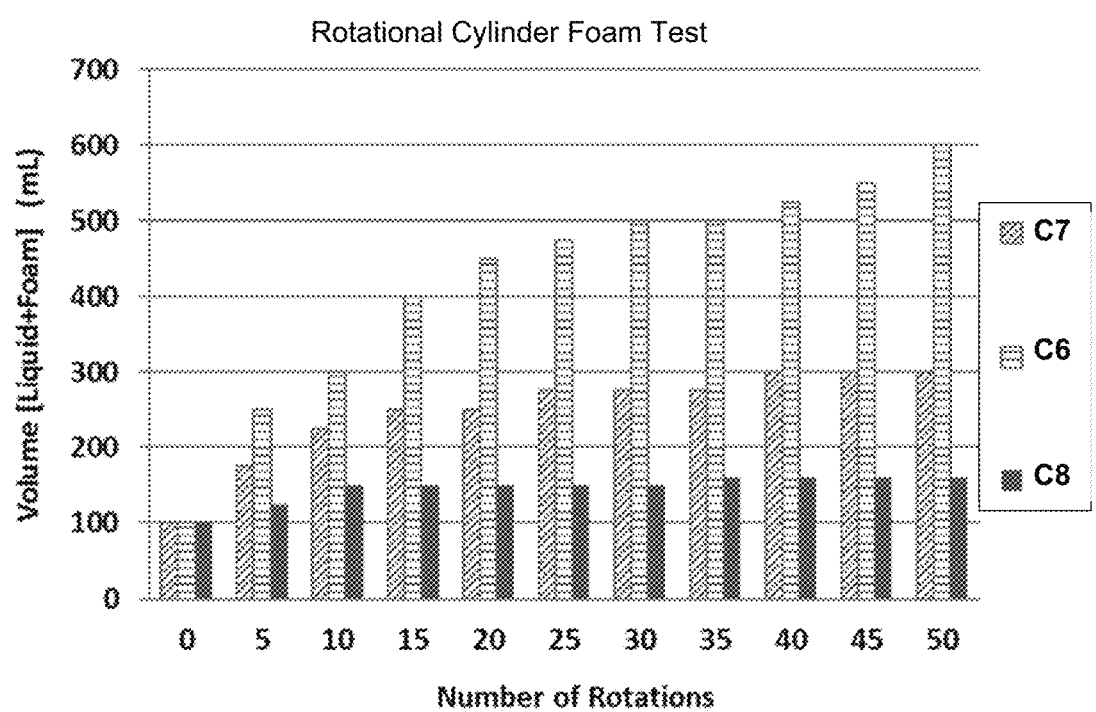
FIG. 1b depicts the rotational cylinder foam volume of Comparative Examples C6-C8.

As shown in FIG. 1b, combination of anionic and cationic surfactant such as Comparative Example C8, which may be used to generate foam conventionally (e.g. foam generation through agitation/shaking), demonstrates a detrimental effect to foam generation, yielding a low foam volume behavior, even with a prolonged foam generation methodology, as measured by Rotational Cylinder Foam Test.

Individual anionic and cationic surfactant composition such as Comparative Examples C7 and C6 exhibit high foam volume behavior measured with the Rotational Cylinder Foam Test as described above. Inventive Examples E1 and E2 exhibit a high initial foam volume due to its inventive method of use (shown in FIG. 1a), despite the use of anionic and cationic surfactants. However, their foam volumes can intrinsically not be determined with conventional Rotational Cylinder Foam Test methodology due to the combination of anionic and cationic surfactants prior to foam generation, as is the case for Comparative Example C8, exhibiting a low foam volume. Based upon this result, it was determined that a different test, such as the Hand Use Foam Application Test or the Initial Foam Volume Upon Dispensing from a Foam Pump test, would be helpful to determine effectiveness of foam reduction.

Example 2

Hand-Use Foam Application Test: Inventive (E3) and Comparative Examples (C9, C10, and C11)

Method of use of the invention is shown with this example. Initial foam of compositions of the invention used according to the method of use of the invention can be comparable to typical cleanser compositions, whereas compositions which directly combine anionic and cationic surfactant do not show acceptable foaming behavior. Further, it shows that during use, the foam level of compositions of the invention used according to the method of use of the invention disappears relatively quickly, whereas the foam created by a typical cleanser compositions remains and subsequently has to be rinsed for a longer time.

Compositions of Comparative Examples C9-C11 and Inventive Example E3 are listed in Table 2. Foam from compositions is generated simultaneously via a dual chamber foam pump (the two chambers contain either the same composition or two different compositions, as indicated in Table 2 for each of the examples) and foam characteristic (foam amount, bubble size, foam texture) is assessed and images are taken. Respective images are depicted in FIGS. 2-5. The images were taken (a) directly after dispensing of the foam, and (b) after the 10 second distribution process in accordance with the Hand-use Foam Application Test described above.

Figure 2A:
FIGS. 2a and 2b show in-use foam results for Example C9.
Figure 2B:
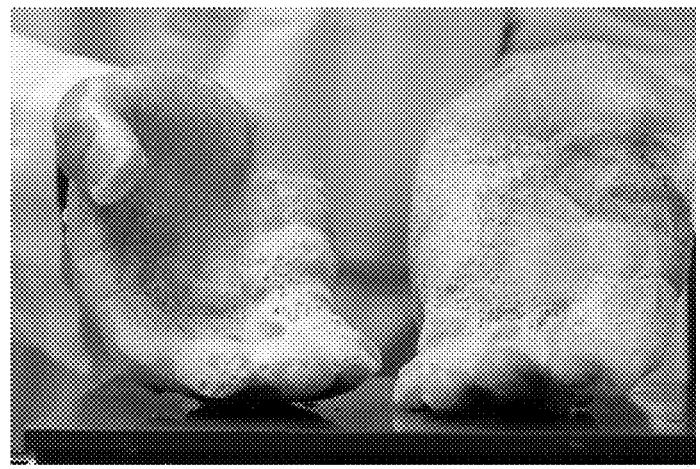
Figure 3A:
FIGS. 3a and 3b show in-use foam results for Example C10.
Figure 3B:
Figure 4A:
FIGS. 4a and 4b show in-use foam results for Example E3.
Figure 4B:
Figure 5A:
FIGS. 5a and 5b show in-use foam results for Example C11.
Figure 5B:
Figure 6A:
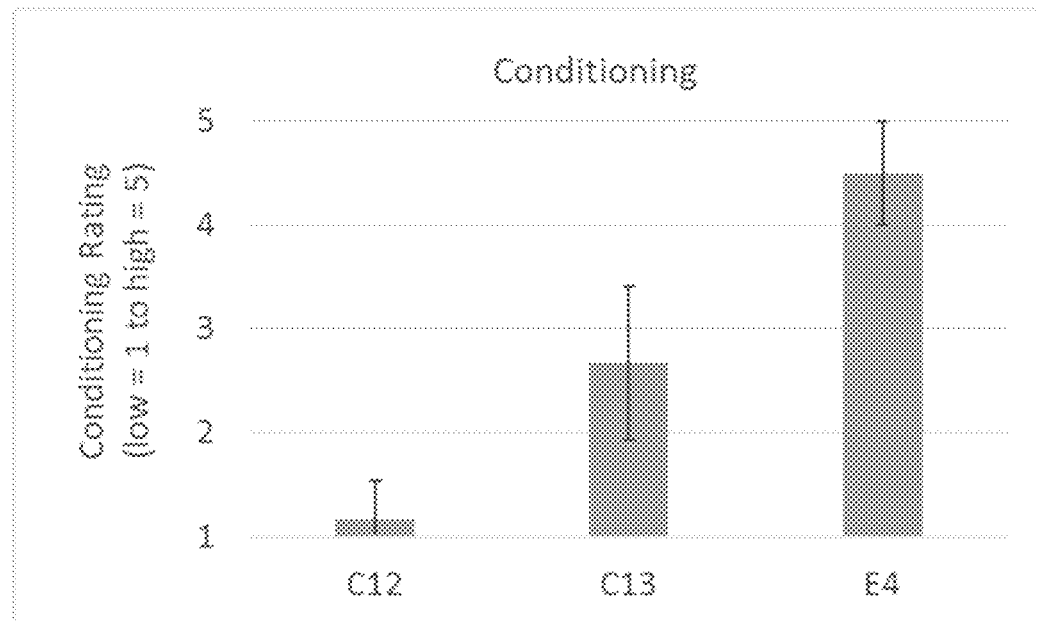
FIG. 6a shows the results of a sensory panel test for the conditioning rating for Examples C12-C13 and E4.
Figure 6B:
FIG. 6b shows the results of a sensory panel test for the softness rating for Examples C12-C13 and E4.
Figure 7:
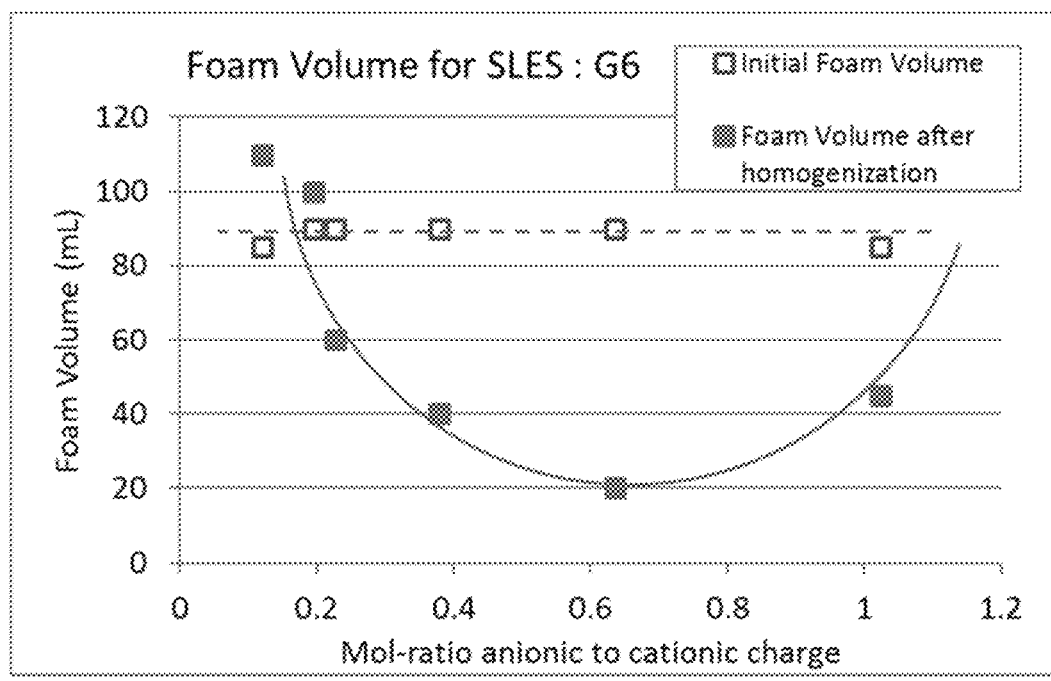
FIG. 7 shows the initial foam volume (open symbols) and foam volume after homogenization (closed symbols) for SLES and G6 for a range of charge mol-ratios. The lines in FIG. 7 are a guide to the eye.

FIG. 2(a) shows C9 as it is initially dispensed with its initial foam, and FIG. 2(b) shows C9 after 10 seconds of mixing of foams from both chambers. FIGS. 3(a) and 3(b) show the same for C10. FIGS. 4(a) and 4(b) show the same for E3. FIGS. 5(a) and 5(b) show the same for C11. The initial foam volumes, shown in the images denoted with (a), are in line with the measured values for the same/comparable compositions using the Initial Foam Volume upon Dispensing from a Foam Pump Test (see table 1a for comparable compositions). C9 and C10 (only anionic or only cationic surfactant, respectively) show good initial foaming as expected from a cleanser, where bubble size is small and the texture is creamy. C11, a combination of anionic and cationic surfactant, shows low initial foam volume—lower than expected from a cleanser—the bubbles are larger, and the texture is considered runny. For Inventive Example E3, however, foams are generated separately for the anionic surfactant composition and the cationic surfactant composition (here using a dual chamber foam pump system). The initial foam volume and characteristic is comparable to C9 and C10, specifically, the result is that a good initial foaming is generated, which would be desired from a cleanser, the bubble size is small, and the texture is creamy.

The foam characteristic after 10 seconds of distribution and mixing of foams from the two chambers between two hands is shown in the images denoted with (b). C9 and C10 show typical surfactant behavior. Significant foam is still present, covering both hands, showing typical bubble size and texture. The rinsing process for this foamed product requires large amounts of water, and ultimately is a longer rinsing time. C11, on the other hand, shows almost no foam remaining and the rinsing is quick. After the 10 seconds of distribution and mixing of foams from the two chambers between two hands, E3 shows also very low foam volume and a cream-like texture instead of a foam-like texture, and the rinsing step for E3 is quicker. E3 provides adequate initial foam as expected from a foaming cleanser (including, for example, a larger volume and a creamy feel), but upon use, the foam collapses rapidly, where the product turns into a cream-like composition which can be easily rinsed.

TABLE 2

Comparative Examples C9-C11 and Inventive Example E3

| | | wt % active material | | | |
|---|---|---|---|---|---|
| | | C9 | C10 | C11 | E3 |
| Material | Material class | | | Chamber 1/Chamber 2 | |
| Sodium Laureth Sulfate | Anionic surfactant | 4/4 | —/— | 2/2 | 4/— |
| G6 | Cationic surfactant | —/— | 16/16 | 8/8 | —/16 |
| Water | Vehicle | q.s. to 100 wt % | q.s. to 100 wt % | q.s. to 100 wt % | q.s. to 100 wt % |
| | pH | 5-6 | 5-6 | 5-6 | 5-6 |

As shown in FIGS. 2 through 5, Inventive example E3 shows a good initial foam, but after 10 seconds distribution/mixing the foam turned into a cream which can be rinsed off quickly. In contrast, Comparative examples C9-10 exhibit good foam stability, and after 10 seconds a significant amount of foam was maintained and hard to rinse. Comparative example C11 shows a low initial foam not suitable and not expected by a user for a desired foaming cleaner. Therefore, of these four examples, only E3 demonstrated good initial foam, with quick foam breaking and quick rinsing.

Example 3

Sensory Panel Evaluation: Inventive (E4) and Comparative Examples (C12-C13)

Example 3 tests desirable sensory benefits from compositions of the invention used according to the method of use of the invention when compared to the sensory behavior of typical cleanser compositions.

Compositions of Comparative Examples C12-C13 and Inventive Example E4 are listed in Table 3a. Foam from compositions was generated simultaneously via a dual chamber foam pump (the two chambers contain either the same composition or two different compositions as indicated in Table 3a for each of the examples). Sensory attributes (conditioning and softness) were assessed in a blinded sensory panel study in accordance with the Sensory Panel Evaluation test described above.

Conditioning level was higher for the Inventive Example E4 compared to the performance of typical cleanser compositions, achieving a conditioning score of 4.5 (on a scale of 1-5) compared to 1.2 and 2.7 for the Comparative Examples. Softness level was also found to be higher for the Inventive Example E4 compared to the performance of typical cleanser compositions, showing a softness score of 4.0 (on a scale of 1-5) compared to 1.2 and 2.2 for the Comparative Examples.

TABLE 3a

Compositions of Comparative Examples C12-C13 and Inventive Example E4

| Material | Material class | C12 | C13 | E4 |
|---|---|---|---|---|
| | | Chamber 1/Chamber 2 | | |
| Sodium Laureth Sulfate | Anionic surfactant | 4/4 | —/— | 4/— |
| G6 | Cationic surfactant | —/— | 16/16 | —/16 |
| Water | Vehicle | q.s. to 100 wt % | q.s. to 100 wt % | q.s. to 100 wt % |
| | pH | 5-6 | 5-6 | 5-6 |

TABLE 3b

Sensory Panel Test Results for Examples C12-C13 and E4.

| | Conditioning Score (1-5) | | | Softness Score (1-5) | | |
|---|---|---|---|---|---|---|
| | Example | | | | | |
| Subject | C12 | C13 | E4 | C12 | C13 | E4 |
| A | 1 | 4 | 4 | 2 | 4 | 5 |
| B | 1 | 3 | 4 | 1 | 3 | 4 |
| C | 2 | 2 | 5 | 1 | 1 | 3 |
| D | 1 | 3 | 4 | 1 | 1 | 4 |
| E | 1 | 2 | 5 | 1 | 2 | 4 |
| F | 1 | 2 | 5 | 1 | 2 | 4 |
| Average | 1.2 | 2.7 | 4.5 | 1.2 | 2.2 | 4.0 |
| STD | 0.4 | 0.7 | 0.5 | 0.4 | 1.1 | 0.6 |

As shown in Tables 3a and 3b, Inventive Example E4 exhibited a softness score from 3-5 and conditioning score from 4-5, while Comparative Examples C12-14 exhibited a softness score from 1-4 and conditioning score from 1-4.

Example 4

High-Shear Foam Mixing Test: Inventive (E5-E22) and Comparative Examples (C14-C33)

Example 4 shows the desirable foaming behavior of the invention for several different anionic and cationic surfactant combinations and shows that certain ratios of anionic to cationic surfactant should be used for this invention.

Compositions of Comparative Examples C14-C33 and Inventive Examples E5-E22 are listed below in Tables 4a to 4c. Foam from compositions was generated simultaneously via a dual chamber foam pump (the two chambers contain an anionic and a cationic surfactant composition as indicated in Tables 4a to 4c for each of the examples) and foam volume was assessed before and after foams are mixed/homogenized in accordance with the High-Shear Foam Mixing Test.

Table 4a shows data for SLES as anionic surfactant and four different cationic surfactants. The observed foam behavior is similar for these 4 examples. To visualize this general behavior, the data for SLES:G6 are shown in FIG. 4a. Initial foam volume for SLES:G6 is high (85 to 90 mL) for all tested ratios of SLES to G6. Foam volume after mixing shows a minimum around a mol-ratio of anionic to cationic charge of ~0.64. Foam volume is reduced effectively for a range of charge mol-ratios; for this system from 0.23 to at least 1.02. Due to the charge-charge interaction, it is expected to see a foam minimum at around 1 for the charge mol-ratio. The deviation for the SLES:G6 system may be due to somewhat inaccurate molecular weight and charge density data for G6.

For the SLES:G1 system, a foam minimum is determined for a charge mol-ratio of around 1.34. The charge mol-ratio range to achieve an effective foam reduction for SLES:G1 is narrower compared to SLES:G6.

For the SLES:laurtrimonium chloride system, a foam minimum is determined for a charge mol-ratio of around 1.29. Foam volume is reduced effectively for a range of charge mol-ratios; for this system from 0.49 or less to around 1.5.

For the SLES:cocamidopropyl dimethylamine system, a foam minimum is determined for a charge mol-ratio of around 0.88. Foam volume is reduced effectively for a range of charge mol-ratios; for this system from 0.88 or less to at least 1.48.

Table 4a-d. Comparative Examples C14-C20 and Inventive Examples E5-E15 using Sodium Laureth Sulfate as Anionic Surfactant The total weight % of the surfactant for each Example was 8.5 wt %. The mol-ratio anionic to cationic charge was calculated using the wt % of surfactant in the composition and the molecular weight per charge as given in the Tables below. For the Examples below, the anionic surfactant: Sodium Laureth Sulfate, the Mw per charge was 376 g/mol; for the cationic surfactant: G6, the Mw per charge was 342 g/mol; for the cationic surfactant: G1, the Mw per charge was 1206 g/mol; for the cationic surfactant: Laurtrimonium Chloride, the Mw per charge was 264 g/mol; for the cationic surfactant: Cocamidopropyl Dimethylamine, the Mw per charge was 304 g/mol ***.

TABLE 4a

| Example | E5 | E6 | E7 | E8 | C14 | C15 |
|---|---|---|---|---|---|---|
| Anionic/Cationic Surfactant | Sodium Laureth Sulfate/G6 | | | | | |
| Mol-ratio anionic to cationic charge | 1.02 | 0.64 | 0.38 | 0.23 | 0.19 | 0.12 |
| Initial foam volume (mL) | 85 | 90 | 90 | 90 | 90 | 85 |
| Foam volume after homogenization (mL) | 45 | 20 | 40 | 60 | 100 | 110 |
| % of initial Foam Volume | 53% | 22% | 44% | 67% | 111% | 129% |

TABLE 4b

| Example | C16 | E9 | C17 | C18 |
|---|---|---|---|---|
| Anionic/Cationic Surfactant | Sodium Laureth Sulfate/G1 | | | |
| Mol-ratio anionic to cationic charge | 2.25 | 1.34 | 0.69 | 0.43 |
| Initial foam volume (mL) | 90 | 90 | 90 | 90 |
| Foam volume after homogenization (mL) | 80 | 60 | 80 | 100 |
| % of initial Foam Volume | 89% | 67% | 89% | 111% |

TABLE 4c

| Example | C19 | E10 | E11 | E12 | E13 |
|---|---|---|---|---|---|
| Anionic/Cationic Surfactant | Sodium Laureth Sulfate/Laurtrimonium Chloride | | | | |
| Mol-ratio anionic to cationic charge | 2.28 | 1.29 | 0.88 | 0.76 | 0.49 |
| Initial foam volume (mL) | 85 | 85 | 80 | 80 | 90 |
| Foam volume after homogenization (mL) | 75 | 20 | 45 | 40 | 50 |
| % of initial Foam Volume | 88% | 24% | 56% | 50% | 56% |

TABLE 4d

| Example | E14 | E15 | C20 |
|---|---|---|---|
| Anionic/Cationic Surfactant | Sodium Laureth Sulfate/ Cocamidopropyl Dimethylamine | | |
| Mol-ratio anionic to cationic charge | 1.48 | 0.88 | 0.57 |
| Initial foam volume (mL) | 90 | 90 | 90 |
| Foam volume after homogenization (mL) | 55 | 45 | 85 |
| % of initial Foam Volume | 61% | 50% | 94% |

*** assuming all amine units are protonated and thus, charged.

The two tables below (Tables 5a & 5b) show data for sodium trideceth sulfate as anionic surfactant and two different cationic surfactants. The observed foam behavior is similar to the SLES systems from Table 4a. Initial foam volume is high (85 to 90 mL) for all tested ratios.

For the sodium trideceth sulfate:G6 system, a foam minimum is determined for a charge mol-ratio of around 0.55. Foam volume is reduced effectively for a range of charge mol-ratios; for this system around 0.55.

For the sodium trideceth sulfate:cocamidopropyl dimethylamine system, a foam minimum is determined for a charge mol-ratio of around 1.05. Foam volume is reduced effectively for a range of charge mol-ratios; for this system from 0.62 or less to at least 1.68.

Tables 5a-b. Comparative Examples C21-C22 and Inventive Examples E16-E19 Using Sodium Trideceth Sulfate as Anionic Surfactant For the examples, the total weight % of surfactant for each Example was 8.5 wt %. The mol-ratio anionic to cationic charge is calculated using the wt % of surfactant in the composition and the molecular weight per charge as given in Table 4b. Anionic surfactant: Sodium Trideceth Sulfate, Mw per charge: 435 g/mol; Cationic surfactant: G6, Mw per charge: 342 g/mol; Cationic surfactant: Cocamidopropyl Dimethylamine, Mw per charge: 304 g/mol ***.

TABLE 5a

| Example | C21 | C22 | E16 |
|---|---|---|---|
| Anionic/cationic surfactant | Sodium Trideceth Sulfate/G6 | | |
| Mol-ratio anionic to cationic charge | 1.89 | 1.18 | 0.55 |
| Initial foam volume (mL) | 90 | 85 | 90 |
| Foam volume after homogenization (mL) | 110 | 100 | 30 |
| % of initial Foam Volume | 122% | 118% | 33% |

TABLE 5b

| Example | E17 | E18 | E19 |
|---|---|---|---|
| Anionic/cationic surfactant | Sodium Trideceth Sulfate/ Cocamidopropyl Dimethylamine | | |
| Mol-ratio anionic to cationic charge | 1.68 | 1.05 | 0.62 |
| Initial foam volume (mL) | 90 | 90 | 90 |
| Foam volume after homogenization (mL) | 35 | 20 | 40 |
| % of initial Foam Volume | 39% | 22% | 44% |

*** assuming all amine units are protonated and thus, charged.

The tables show data for three different anionic surfactants and different cationic surfactants. The observed foam behavior is similar to the SLES systems seen above. Initial foam volume is high (70 to 90 mL) for all tested ratios.

For the sodium methyl cocoyl taurate:lautrimonium chloride system, a foam minimum is determined for a charge mol-ratio of around 0.86. Foam volume is reduced effectively for a range of charge mol-ratios; for this system from about 0.6 to about 1.2.

For the sodium methyl cocoyl taurate:G6 system, no foam minimum is determined. Within the tested charge mol-ratio range, 0.31 to 0.99, the highest ratio shows 72% of initial foam volume vs ≥100% for the other two tested ratios.

For the sodium cocoyl isethionate:G6 system, a foam minimum is determined for a charge mol-ratio of around 0.83.

For the sodium hydrolyzed potato starch dodecenylsuccinate: cocamidopropyl dimethylamine system, a foam minimum is determined for a charge mol-ratio of around 1.05.

Foam volume is reduced effectively for a range of charge mol-ratios; for this system around 1.05.

Tables 6a-d. Comparative Examples C23-C33 and Inventive Examples E20-E22 Using Taurate, Isethionate, and Succinate as Anionic Surfactants For the below examples, the total weight % of surfactant for each Example was 8.5 wt %. The mol-ratio anionic to cationic charge is calculated using the wt % of surfactant in the composition and the molecular weight per charge as given in Table 4c. In the examples, the Anionic surfactant: Methyl Cocoyl Taurate has a Mw per charge: 344 g/mol; the Anionic surfactant: Sodium Cocoyl Isethionate has a Mw per charge: 331 g/mol; the Cationic surfactant: Laurtrimonium Chloride has a Mw per charge: 264 g/mol; the Cationic surfactant: G6, has a Mw per charge: 342 g/mol; the surfactant Sodium Hydrolyzed Potato Starch Dodecenylsuccinate, has a Mw per charge: ~6000 g/mol; and the Cationic surfactant: Cocamidopropyl Dimethylamine has a Mw per charge: 304 g/mol ***.

TABLE 6a

| Example | C23 | E20 | C24 | C25 | C26 |
|---|---|---|---|---|---|
| Anionic/cationic surfactant | Sodium Methyl Cocoyl Taurate/ Lautrimonium Chloride | | | | |
| Mol-ratio anionic to cationic charge | 1.41 | 0.86 | 0.47 | 0.24 | 0.10 |
| Initial foam volume (mL) | 90 | 80 | 90 | 90 | 90 |
| Foam volume after homogenization (mL) | 70 | 35 | 65 | 100 | 100 |
| % of initial Foam Volume | 78% | 44% | 72% | 111% | 111% |

TABLE 6b

| Example | C27 | C28 | C29 |
|---|---|---|---|
| Anionic/cationic surfactant | Sodium Methyl Cocoyl Taurate/G6 | | |
| Mol-ratio anionic to cationic charge | 0.99 | 0.55 | 0.31 |
| Initial foam volume (mL) | 90 | 90 | 70 |
| Foam volume after homogenization (mL) | 65 | 100 | 70 |
| % of initial Foam Volume | 72% | 111% | 100% |

TABLE 6c

| Example | C30 | E21 | C31 |
|---|---|---|---|
| Anionic/cationic surfactant | Sodium Cocoyl Isethionate/G6 | | |
| Mol-ratio anionic to cationic charge | 1.16 | 0.83 | 0.43 |
| Initial foam volume (mL) | 80 | 80 | 80 |
| Foam volume after homogenization (mL) | 85 | 50 | 90 |
| % of initial Foam Volume | 106% | 63% | 113% |

TABLE 6d

| Example | C32 | E22 | C33 |
|---|---|---|---|
| Anionic/cationic surfactant | Sodium Hydrolyzed Potato Starch Dodecenylsuccinate/ Cocamidopropyl Dimethylamine | | |

TABLE 6d-continued

| Example | C32 | E22 | C33 |
|---|---|---|---|
| Mol-ratio anionic to cationic charge | 1.38 | 1.05 | 0.56 |
| Initial foam volume (mL) | 90 | 90 | 80 |
| Foam volume after homogenization (mL) | 70 | 60 | 65 |
| % of initial Foam Volume | 78% | 67% | 81% |

*** assuming all amine units are protonated and thus, charged.

As shown above, for Inventive Examples E5-E22, foam volume was reduced substantially after homogenization (less than 70% of the initial foam volume). In contrast, for Comparative Examples C12-33, foam volume was substantially maintained or even increased after homogenization (greater than 70% of the initial foam volume).

What is claimed is:

1. A cleansing composition comprising a combination of:
    a. A first composition including from 1% to 10% of a single anionic surfactant, wherein no other anionic surfactant is present in the first composition
    b. A second composition including a cationic surfactant;
    wherein the first composition and second composition are maintained in separate containers and are each individually dispensed in the form of a foam, and where the first and second compositions are combined together to form the cleansing composition,
    wherein:
    (i) the anionic surfactant is sodium laureth sulfate, the cationic surfactant is (polyglycerol-10)-tetra-(hydroxypropyl dimethyl lauryl ammonium chloride)-tetra-(hydroxypropyl trimethyl ammonium chloride) and the mol-ratio of anionic to cationic charge is from 0.23 to 1.02;
    (ii) the anionic surfactant is sodium laureth sulfate, the cationic surfactant is (polyglycerol-10)-hydroxypropyl dimethyl lauryl ammonium chloride and the mol-ratio of anionic to cationic charge is 1.34;
    (iii) the anionic surfactant is sodium laureth sulfate, the cationic surfactant is laurtrimonium chloride and the mol-ratio of anionic to cationic charge is from 0.49 to 1.5;
    (iv) the anionic surfactant is sodium laureth sulfate, the cationic surfactant is cocamidopropyl dimethylamine and the mol-ratio of anionic to cationic charge is from 0.88 to 1.48;
    (v) the anionic surfactant is sodium trideceth sulfate, the cationic surfactant is (polyglycerol-10)-tetra-(hydroxypropyl dimethyl lauryl ammonium chloride)-tetra-(hydroxypropyl trimethyl ammonium chloride) and the mol-ratio of anionic to cationic charge is 0.55;
    (vi) the anionic surfactant is sodium methyl cocoyl taurate, the cationic surfactant is lautrimonium chloride and the mol-ratio of anionic to cationic charge is 0.6 to 1.2;
    (vii) the anionic surfactant is sodium trideceth sulfate, the cationic surfactant is cocamidopropyl dimethylamine and the mol-ratio of anionic to cationic charge is from 0.62 to 1.68;
    (viii) the anionic surfactant is sodium cocoyl isethionate, the cationic surfactant is (polyglycerol-10)-tetra-(hydroxypropyl dimethyl lauryl ammonium chloride)-tetra-(hydroxypropyl trimethyl ammonium chloride) and the mol-ratio of anionic to cationic charge is 0.83; or (ix) the anionic surfactant is sodium hydrolyzed potato starch dodecenylsuccinate, the cationic surfactant is cocamidopropyl dimethylamine and the mol-ratio of anionic to cationic charge is 1.05, and wherein after the first composition and second composition are dispensed and combined with each other to form the cleansing composition, the cleansing composition has an initial foam volume of between about 3 mL and about 8 mL as measured by the Initial Foam Volume Upon dispensing from a Foam Pump test, and wherein after about 10 seconds after combining the first composition and second composition to form the cleansing composition, the resulting foam volume of the combined composition is less than 70% of the initial foam volume.

2. The cleansing composition of claim 1, wherein after about 10 seconds after combining the first composition and second composition to form the cleansing composition, the resulting foam volume of the combined composition is less than 50% of the initial foam volume.

3. The cleansing composition of claim 1, where the cationic surfactant comprises a polyglyceryl compound.

4. The cleansing composition of claim 1, wherein the anionic surfactant is sodium laureth sulfate, and the cationic surfactant is (polyglycerol-10) -tetra-(hydroxypropyl dimethyl lauryl ammonium chloride)-tetra-(hydroxypropyl trimethyl ammonium chloride).

5. The cleansing composition of claim 1, wherein the anionic surfactant is sodium laureth sulfate, and the cationic surfactant is (polyglycerol-10) -hydroxypropyl dimethyl lauryl ammonium chloride.

6. The cleansing composition of claim 1, wherein the anionic surfactant is sodium laureth sulfate, and the cationic surfactant is laurtrimonium chloride.

7. The cleansing composition of claim 1, wherein the anionic surfactant is sodium laureth sulfate, and the cationic surfactant is cocamidopropyl dimethylamine.

8. The cleansing composition of claim 1, wherein the anionic surfactant is sodium trideceth sulfate, and the cationic surfactant is (polyglycerol-10) -tetra-(hydroxypropyl dimethyl lauryl ammonium chloride)-tetra-(hydroxypropyl trimethyl ammonium chloride).

9. The cleansing composition of claim 1, wherein the anionic surfactant is sodium methyl cocoyl taurate, and the cationic surfactant is lautrimonium chloride.

10. The cleansing composition of claim 1, wherein the anionic surfactant is sodium trideceth sulfate, and the cationic surfactant is cocamidopropyl dimethylamine.

11. The cleansing composition of claim 1, wherein the anionic surfactant is sodium cocoyl isethionate, and the cationic surfactant is (polyglycerol-10) -tetra-(hydroxypropyl dimethyl lauryl ammonium chloride)-tetra-(hydroxypropyl trimethyl ammonium chloride).

12. The cleansing composition of claim 1, wherein the anionic surfactant is sodium hydrolyzed potato starch dodecenylsuccinate, and the cationic surfactant is cocamidopropyl dimethylamine.

13. The cleansing composition of claim 1, wherein the first composition comprises from 2% to 8% of the anionic surfactant.

* * * * *